US012679363B2

(12) United States Patent
Liu et al.

(10) Patent No.: US 12,679,363 B2
(45) Date of Patent: Jul. 14, 2026

(54) VEHICLE CONTROL METHOD AND APPARATUS

(71) Applicant: Yinwang Intelligent Technologies Co., Ltd., Shenzhen (CN)

(72) Inventors: Nan Liu, Beijing (CN); Hang Liu, Beijing (CN); Mingchao Li, Beijing (CN); Linlin Sui, Beijing (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 249 days.

(21) Appl. No.: 17/895,491

(22) Filed: Aug. 25, 2022

(65) Prior Publication Data
US 2022/0402490 A1 Dec. 22, 2022

Related U.S. Application Data

(63) Continuation of application No. PCT/CN2020/115115, filed on Sep. 14, 2020.

(30) Foreign Application Priority Data
Feb. 25, 2020 (CN) .......................... 202010116095.9

(51) Int. Cl.
*B60W 30/16* (2020.01)
*B60W 30/09* (2012.01)
(Continued)

(52) U.S. Cl.
CPC ............ *B60W 30/16* (2013.01); *B60W 30/09* (2013.01); *B60W 30/0953* (2013.01);
(Continued)

(58) Field of Classification Search
CPC . B60W 2050/0054; B60W 2050/0067; B60W 2050/143; B60W 2050/146;
(Continued)

(56) References Cited

U.S. PATENT DOCUMENTS

2003/0135318 A1* 7/2003 Tellis ........................ B60T 7/22
340/436
2015/0006056 A1* 1/2015 Fairgrieve ............. B60W 30/16
701/96
(Continued)

FOREIGN PATENT DOCUMENTS

CN 104123851 A 10/2014
CN 105035071 A 11/2015
(Continued)

*Primary Examiner* — Andrew J Cromer
(74) *Attorney, Agent, or Firm* — Conley Rose, P.C.

(57) ABSTRACT

A vehicle control method implemented by a first vehicle configured with at least one driver assistance system. The method includes activating a driver assistance system to an active state, applying a vehicle speed range to the first vehicle in response to the driver assistance system being in the active state, obtaining first information of a moving object near the first vehicle, determining a first parameter based on the first information, and further terminating, based on the first parameter, the active state, and setting, based on the first parameter, the first vehicle to run at a first vehicle speed beyond the vehicle speed range.

20 Claims, 13 Drawing Sheets

Road surface    Vehicle reference point

Vehicle reference point

(51) Int. Cl.
    *B60W 30/095*          (2012.01)
    *B60W 50/06*           (2006.01)
(52) U.S. Cl.
    CPC ........ *B60W 30/0956* (2013.01); *B60W 50/06*
        (2013.01); *B60W 2520/00* (2013.01); *B60W*
        *2554/4041* (2020.02)
(58) Field of Classification Search
    CPC ......... B60W 2520/00; B60W 2552/30; B60W
        2554/4029; B60W 2554/4041; B60W
        2554/4042; B60W 2554/80; B60W
        2555/60; B60W 2556/45; B60W 2556/65;
        B60W 2720/10; B60W 30/0953; B60W
        30/0956; B60W 30/143; B60W 30/16;
        B60W 30/17; B60W 30/182; B60W
        40/072; B60W 50/06; B60W 50/082;
        B60W 50/14; B60W 50/16; B60W
        60/0053; B60W 60/0057; B60W 40/105
    See application file for complete search history.

(56)                References Cited

U.S. PATENT DOCUMENTS

2016/0129908 A1*   5/2016   Harda ................. B60W 30/146
                                                        701/24
2018/0208195 A1    7/2018   Hutcheson et al.
2020/0064839 A1*   2/2020   Oyama ................. B60K 28/10

FOREIGN PATENT DOCUMENTS

CN           105946620  A      9/2016
CN           106080600  A     11/2016
CN           109195847  A      1/2019
DE        102005031608  A1     2/2007
WO          2012085611  A1     6/2012
WO          2013124320  A1     8/2013

* cited by examiner

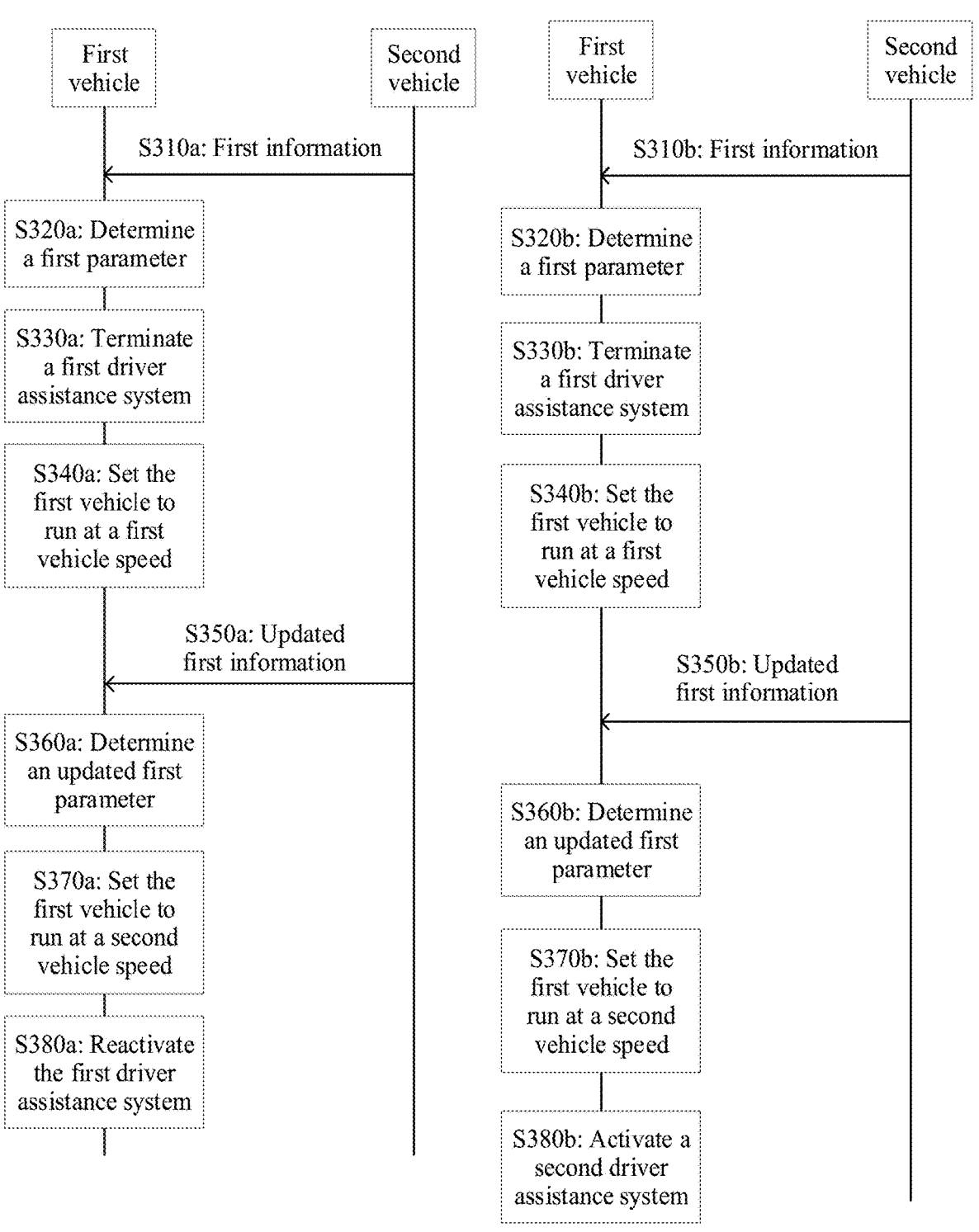
FIG. 3A                    FIG. 3B

Second vehicle                 First vehicle

Second vehicle                 First vehicle

VEHICLE CONTROL METHOD AND APPARATUS

CROSS-REFERENCE TO RELATED APPLICATIONS

This application is a continuation of International Patent Application No. PCT/CN2020/115115, filed on Sep. 14, 2020, which claims priority to Chinese Patent Application No. 202010116095.9, filed on Feb. 25, 2020. The disclosures of the aforementioned applications are hereby incorporated by reference in their entireties.

TECHNICAL FIELD

The present disclosure relates to the field of intelligent driving technologies, and more specifically, to a vehicle control method and apparatus.

BACKGROUND

With continuous development of the society, popularity of vehicles has soared, and problems such as traffic congestion, road safety, and environmental pollution caused by the vehicles are increasingly severe. To resolve these problems, intelligent connected vehicles are proposed. As an advanced form of intelligent and connected development of vehicles, the intelligent connected vehicles help improve road traffic safety and achieve safe, efficient, and green travels.

The intelligent connected vehicles are equipped with advanced on-board sensors, controllers, actuators, and other apparatuses, and integrate modern communication and network technologies to implement vehicle-to-everything (V2X). The development trend of the intelligent connected vehicles is to integrate the autonomous driving technology and networked communication technology to give full play to the technical advantages of both technologies. A driver assistance system is a generic term of various systems that assist a driver in performing a driving task or actively avoid/mitigate a collision hazard by using an autonomous driving technology. Such system includes an adaptive cruise control (ACC) system, or a traffic jam assist (TJA) system.

The driver assistance system corresponds to a vehicle speed range, and different driver assistance systems may correspond to different vehicle speed ranges. Once a vehicle speed exceeds a vehicle speed range corresponding to a driver assistance system, the driver assistance system is deactivated, and exits control over the vehicle. For safety or other considerations, when a vehicle speed matching a driving environment is not within a vehicle speed range corresponding to the driver assistance system, if the driver assistance system is still in an active state and controls a driving speed of the vehicle to remain within the corresponding vehicle speed range, a safety hazard is caused. If a driver takes over the driving task in this case, continuity of autonomous driving of the vehicle is affected, and user experience is poor.

SUMMARY

The present disclosure provides a vehicle control method, applied to the field of intelligent driving technologies, to improve safety performance of autonomous driving of a vehicle and user experience.

According to a first aspect, a vehicle control method is provided. The vehicle control method may be performed by a first vehicle, or may be performed by a chip, a circuit, a component, a system, or a mobile terminal disposed on the first vehicle, or may be performed by another device (for example, a roadside unit (RSU) or an application server) in the vehicle-to-everything. This is not limited in this application. The vehicle control method is applied to the first vehicle, the first vehicle is configured with at least one driver assistance system, the at least one driver assistance system is applied to at least one vehicle speed range when being in an active state, and the method includes: obtaining first information of a moving object near the first vehicle; determining a first parameter based on the first information; terminating, based on the first parameter, an active state of a driver assistance system that is currently in an active state and that is in the at least one driver assistance system; and further setting, based on the first parameter, the first vehicle to run at a first vehicle speed beyond the at least one vehicle speed range.

It should be noted that, that the at least one driver assistance system is applied to at least one vehicle speed range when being in an active state may be understood as follows: When a driver assistance system is in the active state, the first vehicle is in a vehicle speed range in which the driver assistance system can be activated; or when a driver assistance system is in the active state, the driver assistance system controls driving decision-making and a driving action of the first vehicle configured with the driver assistance system.

In embodiments of this application, that a driver assistance system is in an active state means that a vehicle configured with the driver assistance system is under automatic control of the driver assistance system, and the vehicle may be controlled without intervention of a driver; or this may indicate that the driver assistance system is in a working state or a running state. It is easy to understand that when the driver assistance system does not control the vehicle configured with the driver assistance system, this may indicate that the driver assistance system is in a deactivated state, an inactive state, a non-working state, or a non-running state.

The moving object near the first vehicle may be a moving object in front of the first vehicle, or the moving object near the first vehicle may be a moving object behind the first vehicle, or the moving object near the first vehicle may be a moving object on a side of the first vehicle. In addition, there may be one or more moving objects near the first vehicle. A quantity of moving objects near the first vehicle is not limited in embodiments of this application. For example, when there are a plurality of moving objects near the first vehicle, the first vehicle may separately obtain first information about the plurality of moving objects.

For example, a possible form of the moving object includes a pedestrian, a vehicle, or another movable object. Considering that a scenario to which embodiments of the present disclosure are applied includes vehicle-to-vehicle (V2V) communication, the moving object near the first vehicle may be another vehicle (referred to as a second vehicle for differentiation) near the first vehicle.

According to the vehicle control method provided in embodiments of this application, when the first vehicle is configured with the at least one driver assistance system, the active state of the driver assistance system that is currently in the active state is terminated based on the first parameter determined based on the obtained first information of the moving object near the first vehicle, and the first vehicle is controlled, based on the first parameter, to run at a vehicle speed beyond a vehicle speed range to which the at least one configured driver assistance system is applied. Therefore, when a safe speed matching a driving environment is not within a vehicle speed range corresponding to the driver assistance system, the first vehicle can still implement safe autonomous driving without intervention of a driver, so that safety performance of autonomous driving of the vehicle and user experience is improved.

The determining a first parameter based on the first information may be directly determining the first parameter based on the first information, or may be indirectly determining the first parameter based on the first information. For example, the directly determining the first parameter based on the first information may be obtaining the first parameter through calculation based on the obtained first information, or may be obtaining the first parameter through table lookup based on the obtained first information. For another example, the indirectly determining the first parameter based on the first information may be obtaining a second parameter through calculation and/or table lookup based on the obtained first information, where the second parameter is used to determine the first parameter.

The terminating, based on the first parameter, an active state of a driver assistance system that is currently in an active state and that is in the at least one driver assistance system may be directly terminating the active state based on the first parameter, or may be indirectly terminating the active state based on the first parameter, for example, terminating the active state based on a result obtained after other data processing is performed by using the first parameter.

The setting, based on the first parameter, the first vehicle to run at a first vehicle speed beyond the at least one vehicle speed range may be directly setting the first vehicle speed based on the first parameter, or may be indirectly setting the first vehicle speed based on the first parameter, for example, setting the first vehicle speed based on a result obtained after other data processing is performed by using the first parameter.

With reference to the first aspect, in some implementations of the first aspect, the method further includes: obtaining updated first information; updating the first parameter based on the updated first information; setting, based on an updated first parameter, the first vehicle to run at a second vehicle speed within the at least one vehicle speed range; and activating one of the at least one driver assistance system based on the updated first parameter.

Further, when a vehicle speed matching the driving environment is not within the vehicle speed range corresponding to the current driver assistance system (for example, a first driver assistance system), a vehicle speed of the first vehicle may be controlled based on the first parameter, so that the vehicle speed of the first vehicle reaches a vehicle speed range applied when another driver assistance system (for example, a second driver assistance system) of the at least one configured driver assistance system is in an active state, and the another driver assistance system is activated, so that the first vehicle is under control of the another driver assistance system, to improve safety performance of autonomous driving of the vehicle.

With reference to the first aspect, in some implementations of the first aspect, the obtaining first information of a moving object near the first vehicle includes: The first vehicle receives the first information from the moving object by using a communication unit; or obtains the first information of the moving object through measurement by using a sensor.

The first information may be obtained in the following manners: The communication unit disposed on the first vehicle may receive the first information sent by the moving object, or the sensor disposed on the first vehicle may obtain the first information of the moving object. Different manners of obtaining the first information are proposed, to improve flexibility of the solution.

With reference to the first aspect, in some implementations of the first aspect, the first parameter includes a safe driving speed range that the first vehicle is supposed to have when there is no hazard of collision between the first vehicle and the moving object.

The first parameter may be the safe driving speed range that the first vehicle is supposed to have when there is no hazard of collision between the first vehicle and the moving object. A driving speed of the first vehicle is set based on the first parameter, so that collision between the first vehicle and the moving object can be avoided, and autonomous driving safety is improved.

With reference to the first aspect, in some implementations of the first aspect, the first parameter includes a parameter used to determine whether there is a hazard of collision between the first vehicle and the moving object. When there is no hazard of collision between the first vehicle and the moving object, a driving speed range of the first vehicle includes the safe driving speed range.

The first parameter may be used to determine whether there is a hazard of collision between the first vehicle and the moving object, and when there is no hazard of collision between the first vehicle and the moving object, the first vehicle runs at a speed within the safe driving speed range. The driving speed of the first vehicle is set based on the first parameter, so that a collision between the first vehicle and the moving object can be avoided, and autonomous driving safety is improved.

With reference to the first aspect, in some implementations of the first aspect, the first information includes speed information of the moving object and location information of the moving object. The first parameter includes estimated time to collision TTC of the first vehicle and the moving object. The determining the first parameter based on the first information includes: calculating a relative speed of the first vehicle and the moving object based on a speed of the moving object and the vehicle speed of the first vehicle; calculating an inter-vehicle distance between the first vehicle and the moving object based on a location of the moving object and a location of the first vehicle; and calculating the TTC based on the inter-vehicle distance and the relative speed.

When the TTC is a non-positive number or the TTC is greater than a first preset threshold, the first vehicle determines that there is no hazard of collision between the first vehicle and the moving object.

The first preset threshold may be a value of the TTC when there is a hazard of collision between the first vehicle and the moving object. In other words, the first preset threshold may be used to determine a possibility of collision between the first vehicle and the moving object.

Alternatively, the first information includes the location information of the moving object, and the first parameter includes a time interval TI between the first vehicle and the moving object. The calculating the first parameter based on the first information includes: calculating an inter-vehicle distance between the first vehicle and the second vehicle based on the location information of the moving object and the location of the first vehicle; and calculating the TI based on the inter-vehicle distance and the speed of the first vehicle.

When the TI is greater than a second preset threshold, the first vehicle determines that there is no hazard of collision between the first vehicle and the moving object.

The second preset threshold may be a value of the TI when there is a hazard of collision between the first vehicle and the moving object. In other words, the second preset threshold may be used to determine a possibility of collision between the first vehicle and the moving object.

Embodiments of the present disclosure provide a plurality of solutions for determining, based on the first parameter, whether there is a hazard of collision between the first vehicle and the moving object, to improve flexibility of the solutions.

With reference to the first aspect, in some implementations of the first aspect, the terminating, based on the first parameter, an active state of a driver assistance system that is currently in an active state and that is in the at least one driver assistance system includes: The first vehicle determines that the safe driving speed range does not intersect with a vehicle speed range to which the driver assistance system in the active state is applied; and the first vehicle terminates the active state of the driver assistance system in the active state.

In embodiments of this application, whether to terminate the active state of the first driver assistance system may be determined based on whether there is an intersection between the safe driving speed range and a vehicle speed range to which the first driver assistance system in the active state is applied, and a specific implementation of terminating an active state of a driver assistance system is provided.

With reference to the first aspect, in some implementations of the first aspect, the first vehicle speed is within the safe driving speed range, to meet the vehicle speed matching the driving environment.

With reference to the first aspect, in some implementations of the first aspect, the first parameter includes the safe driving speed range that the first vehicle is supposed to have when there is no hazard of collision between the first vehicle and the moving object. The setting, based on an updated first parameter, the first vehicle to run at a second vehicle speed within the at least one vehicle speed range includes: determining that the safe driving speed range has an intersection with the at least one vehicle speed range; and setting, based on the updated first parameter, the first vehicle to run at the second vehicle speed in the intersection between the safe driving speed range and the at least one vehicle speed range.

In embodiments of this application, the driving speed of the first vehicle may be determined and set based on the intersection between the safe driving speed range and the at least one vehicle speed range to which the at least one driver assistance system configured for the first vehicle is applied. In this way, the driving speed of the first vehicle is within the intersection between the safe driving speed range and the at least one vehicle speed range, to ensure that the first vehicle can automatically drive for longer time under control of the configured driver assistance system.

With reference to the first aspect, in some implementations of the first aspect, the activating one of the at least one driver assistance system based on the updated first parameter includes: activating one of the at least one driver assistance system, where a vehicle speed range corresponding to an active state of the one driver assistance system includes the second vehicle speed.

Specifically, that a driver assistance system (for example, the second driver assistance system) in the at least one driver assistance system configured for the first vehicle is activated may be understood as that a vehicle speed range applied when the driver assistance system configured for the first vehicle is in the active state includes the second vehicle speed.

With reference to the first aspect, in some implementations of the first aspect, that the first vehicle is configured with at least one driver assistance system, and the at least one driver assistance system is applied to at least one vehicle speed range when being in an active state includes: The first vehicle is configured with a first driver assistance system and a second driver assistance system, the first driver assistance system is applied to a first vehicle speed range when being in an active state, the second driver assistance system is applied to a second vehicle speed range when being in an active state, and the first vehicle speed range and the second vehicle speed range have no intersection. The terminating, based on the first parameter, an active state of a driver assistance system that is currently in an active state and that is in the at least one driver assistance system includes: terminating, based on the first parameter, the active state of the first driver assistance system that is currently in the active state. The activating one of the at least one driver assistance system based on the updated first parameter includes: activating the first driver assistance system or the second driver assistance system based on the updated first parameter.

According to the vehicle control method provided in embodiments of this application, when the first vehicle is configured with the first driver assistance system and the second driver assistance system, and there is no intersection between the first vehicle speed range to which the first driver assistance system is applied and the second vehicle speed range to which the second driver assistance system is applied, when the vehicle speed reaches an upper limit or a lower limit of the first vehicle speed range, the first vehicle can determine the first parameter based on the obtained first information, and determine and continue to control, based on the first parameter, the first vehicle to accelerate or decelerate, so that the vehicle speed of the first vehicle exceeds the first vehicle speed range and further reaches the second vehicle speed range, to activate the second driver assistance system. In this process, the first vehicle can automatically control the speed of the first vehicle and activate the second driver assistance system when the first driver assistance system exits.

Alternatively, when the vehicle speed reaches the upper limit or the lower limit of the first vehicle speed range, the first vehicle can determine the first parameter based on the obtained first information, and determine and continue to control the vehicle speed of the first vehicle based on the first parameter, so that the vehicle speed of the first vehicle exceeds the first vehicle speed range. In a subsequent automatic control process, if a safe speed permitted by the driving environment is within the first vehicle speed range, the vehicle speed is controlled to return to the first vehicle speed range, so as to reactivate the first driver assistance system. In this process, the first vehicle can automatically control the speed of the first vehicle when the first driver assistance system exits, and reactivate the first driver assistance system when the driving environment permits.

The activating the first driver assistance system or the second driver assistance system does not need to be taken over by a driver. This improves autonomous driving continuity of the first vehicle.

With reference to the first aspect, in some implementations of the first aspect, when the vehicle speed of the first vehicle reaches the upper limit or the lower limit of the first vehicle speed range, the controlling the vehicle speed of the first vehicle based on the first parameter, so that one of the at least one driver assistance system is in the active state includes: when the vehicle speed of the first vehicle reaches the upper limit of the first vehicle speed range, controlling, based on the first parameter, the first vehicle to accelerate, to terminate the active state of the first driver assistance system, and then controlling, based on the updated first parameter, the first vehicle to decelerate, so that the first driver assistance system is in the active state again; or when the vehicle speed of the first vehicle reaches the lower limit of the first vehicle speed range, controlling, based on the first parameter, the first vehicle to decelerate, to terminate the active state of the first driver assistance system, and then controlling, based on the updated first parameter, the first vehicle to accelerate, so that the first driver assistance system is in the active state again.

In embodiments of this application, when the first vehicle is configured with the first driver assistance system, after the first driver assistance system exits, the first vehicle may be controlled, based on the first parameter, to accelerate and then decelerate, or the first vehicle may be controlled, based on the first parameter, to decelerate and then accelerate, so that the first vehicle returns to the control of the first driver assistance system. This can increase time for controlling a vehicle by a driver assistance system, thereby improving autonomous driving performance of the vehicle.

With reference to the first aspect, in some implementations of the first aspect, the moving object includes the second vehicle.

In a possible implementation, the moving object in front of the first vehicle may be the second vehicle in front of the first vehicle, and the first information includes a location and a speed of the second vehicle.

With reference to the first aspect, in some implementations of the first aspect, the first information further includes type information of the moving object.

The first information may further include the type information of the moving object, for example, a model and a size of the vehicle.

According to a second aspect, a vehicle control apparatus is provided. The vehicle control apparatus is applied to a first vehicle, the first vehicle is configured with at least one driver assistance system, and the at least one driver assistance system is applied to at least one vehicle speed range when being in an active state. The vehicle control apparatus includes a processor configured to run computer program instructions to implement the method described in any one of the first aspect and the possible implementations of the first aspect.

Optionally, the vehicle control apparatus may further include a memory, and the memory is configured to store program instructions and data. The memory is coupled to the processor, and the processor may invoke and execute the program instructions stored in the memory, to implement the method described in any one of the first aspect and the possible implementations of the first aspect.

Optionally, the vehicle control apparatus may further include a communication interface, and the communication interface is used by the vehicle control apparatus to communicate with another device. When the vehicle control apparatus is a network device, the communication interface is a transceiver, an input/output interface, a circuit, or the like.

In a possible design, the vehicle control apparatus includes a processor and a communication interface. The processor communicates with an external device through the communication interface.

The processor is configured to run a computer program, so that the apparatus implements any method described in any one of the first aspect and the possible implementations of the first aspect.

It may be understood that the external device may be an object other than the processor, or an object other than the apparatus.

In another possible design, the vehicle control apparatus is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to a third aspect, a computer-readable storage medium is provided. The computer-readable storage medium stores a computer program. When the computer program is executed by a processor, the vehicle control apparatus is enabled to implement the method according to any one of the first aspect and the possible implementations of the first aspect.

According to a fourth aspect, a computer program product including instructions is provided. When the instructions are executed by a processor, the vehicle control apparatus is enabled to implement the method according to any one of the first aspect and the possible implementations of the first aspect.

According to a fifth aspect, a vehicle control apparatus is provided. The vehicle control apparatus is applied to a first vehicle, the first vehicle is configured with at least one driver assistance system, the at least one driver assistance system is applied to at least one vehicle speed range when being in an active state, and the vehicle control apparatus includes an obtaining unit and a processing unit.

The obtaining unit is configured to obtain first information of a moving object near the first vehicle. The processing unit is configured to determine a first parameter based on the first information. The processing unit is further configured to terminate, based on the first parameter, an active state of a driver assistance system that is currently in an active state and that is in the at least one driver assistance system. The processing unit is further configured to set, based on the first parameter, the first vehicle to run at a first vehicle speed beyond the at least one vehicle speed range.

With reference to the fifth aspect, in some implementations of the fifth aspect, the obtaining unit is further configured to obtain an updated first information; the processing unit is further configured to update the first parameter based on the updated first information; the processing unit is further configured to set, based on an updated first parameter, the first vehicle to run at a second vehicle speed within the at least one vehicle speed range; and the processing unit is further configured to activate one of the at least one driver assistance system based on the updated first parameter.

With reference to the fifth aspect, in some implementations of the fifth aspect, the moving object includes a second vehicle, and the first information includes at least one of a location, a speed, a size, or a model of the second vehicle.

With reference to the fifth aspect, in some implementations of the fifth aspect, the obtaining unit includes a receiving unit or a measurement unit. The receiving unit is configured to receive the first information from the moving object; or the measurement unit is configured to obtain the first information of the moving object through measurement.

With reference to the fifth aspect, in some implementations of the fifth aspect, the first parameter includes a safe driving speed range that the first vehicle is supposed to have when there is no hazard of collision between the first vehicle and the moving object.

With reference to the fifth aspect, in some implementations of the fifth aspect, that the processing unit terminates, based on the first parameter, an active state of a driver assistance system that is currently in an active state and that is in the at least one driver assistance system includes: The processing unit determines that the safe driving speed range does not intersect with a vehicle speed range corresponding to the active state of the driver assistance system in the active state; and the processing unit terminates the active state of the driver assistance system in the active state.

With reference to the fifth aspect, in some implementations of the fifth aspect, the first vehicle speed is within the safe driving speed range.

With reference to the fifth aspect, in some implementations of the fifth aspect, the first parameter includes the safe driving speed range that the first vehicle is supposed to have when there is no hazard of collision between the first vehicle and the moving object. That the processing unit sets, based on an updated first parameter, the first vehicle to run at a second vehicle speed within the at least one vehicle speed range includes: The processing unit determines that the safe driving speed range has an intersection with the at least one vehicle speed range; and the processing unit sets, based on the updated first parameter, the first vehicle to run at the second vehicle speed in the intersection between the safe driving speed range and the at least one vehicle speed range.

With reference to the fifth aspect, in some implementations of the fifth aspect, that the processing unit activates one of the at least one driver assistance system based on the updated first parameter includes: The processing unit activates one of the at least one driver assistance system. A vehicle speed range corresponding to an active state of the one driver assistance system includes the second vehicle speed.

With reference to the fifth aspect, in some implementations of the fifth aspect, that the first vehicle is configured with at least one driver assistance system, and the at least one driver assistance system is applied to at least one vehicle speed range when being in an active state includes: The first vehicle is configured with a first driver assistance system and a second driver assistance system, the first driver assistance system is applied to a first vehicle speed range when being in an active state, the second driver assistance system is applied to a second vehicle speed range when being in an active state, and the first vehicle speed range and the second vehicle speed range have no intersection. That the processing unit terminates, based on the first parameter, an active state of a driver assistance system that is currently in an active state and that is in the at least one driver assistance system includes: The processing unit terminates, based on the first parameter, the active state of the first driver assistance system that is currently in the active state. That the processing unit activates one of the at least one driver assistance system based on the updated first parameter includes: The processing unit activates the first driver assistance system or the second driver assistance system based on the updated first parameter.

BRIEF DESCRIPTION OF DRAWINGS

FIG. 3A is a flowchart of a vehicle control method according to an embodiment of the present disclosure;

FIG. 3B is a flowchart of a vehicle control method according to an embodiment of the present disclosure;

DESCRIPTION OF EMBODIMENTS

The following describes technical solutions of the present disclosure with reference to accompanying drawings.

Terms used in the following embodiments are merely intended to describe specific embodiments, but are not intended to limit this application. As used in the specification and appended claims of this application, singular expressions "one", "a", "the", "the foregoing", "this", and "the one" are also intended to include expressions such as "one or more", unless otherwise specified in the context clearly. It should be further understood that in the following embodiments of this application, "at least one" and "one or more" refer to one, two, or more.

Reference to "one embodiment" or "some embodiments" described in this specification or the like means that one or more embodiments of the present disclosure include a particular feature, structure, or characteristic described in combination with the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "contain", "have", and their variants all mean "include but are not limited to", unless otherwise specifically emphasized in another manner.

The technical solutions in embodiments of the present disclosure may be applied to a V2X communication system. With continuous development of the society, popularity of vehicles has soared. While bringing convenience to people in traveling, vehicles also have some negative impact on human society. A rapid increase in a quantity of vehicles causes a series of problems such as urban traffic congestion, frequent traffic accidents, and worse environment quality. In aspects such as personal safety, transportation efficiency, environmental protection, and economic effects, a complete set of intelligent transportation system (ITS) is needed. Currently, the ITS has naturally become a global concern.

Currently, a vehicle may obtain timely road condition information or receive timely service information through communication manners such as V2V, vehicle-to-infrastructure (V2I), vehicle-to-pedestrian (V2P), or vehicle-to-network (V2N). These communication manners may be collectively referred to as V2X communication (X represents anything).

Figure 1:
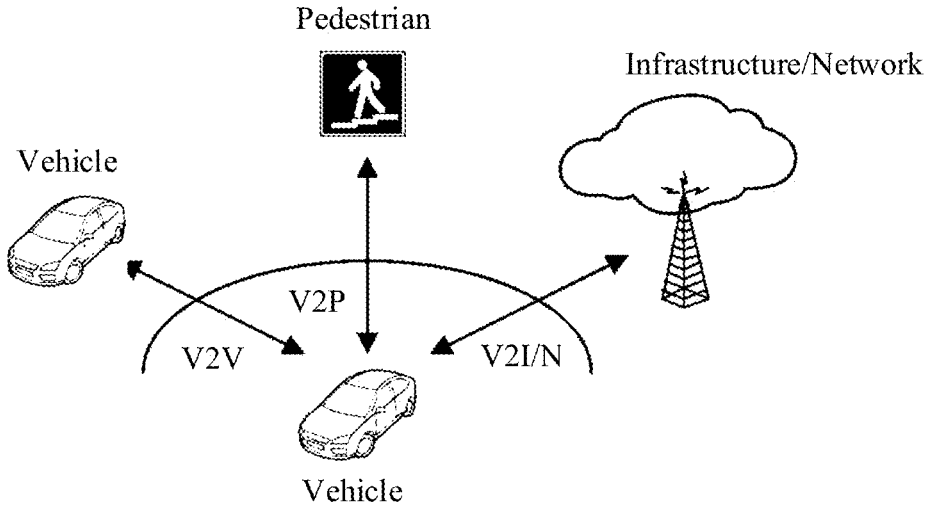
FIG. 1 is a schematic diagram of an intelligent driving scenario to which an embodiment of the present disclosure is applied.

FIG. 1 is a schematic diagram of an intelligent driving scenario to which an embodiment of the present disclosure is applied. The scenario includes V2V communication, V2P communication, and V2I/N communication. As shown in FIG. 1, communication between vehicles is performed through V2V. A vehicle may broadcast information about the vehicle such as a driving speed, a driving direction, a specific location, and abrupt deceleration to a surrounding vehicle, so that a driver of the surrounding vehicle can obtain the information to better learn of a traffic condition outside a line of sight, to predict a danger and further avoid the danger. Communication between the vehicle and roadside infrastructure is performed through V2I. The roadside infrastructure may provide access of various types of service information and data networks for the vehicle. Functions such as non-parking toll and in-car entertainment greatly improve traffic intelligence. The roadside infrastructure such as a road side unit (RSU) includes two types. One type is an RSU in a terminal device type. Because the RSU is distributed on the roadside, the RSU in the terminal device type is in a non-mobile state, and mobility does not need to be considered. The other type is an RSU in a network device type. The RSU in the network device type may provide timing synchronization and resource scheduling for a vehicle communicating with the network device. Vehicle-to-human (for example, vehicle-to-pedestrian, vehicle-to-cyclist, or vehicle-to-driver, or vehicle-to-passenger) communication is performed through V2P. Vehicle-to-network communication is performed through V2N. V2N and V2I may be collectively referred to as V2I/N.

It should be understood that FIG. 1 is merely an example of a schematic diagram, and constitutes no limitation on this application. For example, there may be a plurality of vehicles, pedestrians, and infrastructure whose quantities are not those shown in FIG. 1.

FIG. 1 describes a scenario to which an embodiment of the present disclosure is applicable. For ease of understanding of the technical solutions of this application, the following briefly describes several basic concepts in the technical solutions of this application.

1. Intelligent Connected Vehicle

The intelligent connected vehicle is a next-generation vehicle that is equipped with advanced on-board sensors, controllers, actuators, and other apparatuses, integrates modern communication and network technologies to implement V2X intelligent information exchange and sharing, and provides functions such as complex environment awareness, intelligent decision-making, and collaborative control to implement safe, efficient, comfortable, and energy-saving driving and finally implement driving with human intervention.

The development trend of intelligent connected vehicles is to integrate the autonomous driving technology and networked communication technology to give full play to the technical advantages of both technologies. The autonomous driving technology gradually evolves from a low-level advanced driver assistance system to a high-level autonomous driving system. The advanced driver assistance system is a generic term of various systems that use sensing, communication, decision-making, execution, and other apparatuses installed on a vehicle to monitor a driver, a vehicle, and a driving environment in real time, and assist the driver in executing a driving task or actively avoid/mitigate a collision hazard through information and/or motion control, for example, an ACC system. In the networked communication technology, most common vehicle-to-vehicle communication is used. A vehicle may broadcast information such as a driving speed, a driving direction, a specific location, and vehicle information (a wheel base and a vehicle size) of the vehicle to a surrounding vehicle through V2V communication, so that an autonomous driving system of the surrounding vehicle can make a corresponding driving action decision based on the V2V information, for example, accelerate, decelerate, and make a lane change.

2. Adaptive Cruise Control System

Vehicle cruise means that a vehicle runs at a constant speed. Therefore, a cruise control system (CCS) of a vehicle is also referred to as a constant-speed control system. The ACC system is an intelligent automatic speed control system developed based on the cruise control technology. Because the adaptive cruise control system may automatically take proper measures (for example, accelerate, decelerate, and brake) based on a traffic condition, the adaptive cruise control system can well adapt to driving on a road with a complex road condition.

The ACC system has a fixed vehicle speed range, which is generally 65 kilometers per hour (km/h) to 120 km/h. Within the vehicle speed range, the ACC system controls longitudinal motion of the vehicle (for example, acceleration, deceleration, or driving at a constant speed) by continuously controlling an engine, a drive system, or a braking system of the vehicle, and keeps a proper distance from a front vehicle to reduce labor intensity of the driver and ensure driving safety. Beyond the vehicle speed range (for example, a vehicle speed is less than 65 km/h or greater than 120 km/h), the ACC system automatically exits and cannot be activated.

3. Traffic Jam Assist System

The TJA system also has a fixed vehicle speed range, which is generally 0 km/h to 60 km/h. Within the vehicle speed range, the TJA system continuously controls lateral (steering system) and longitudinal motions of the vehicle, so that the vehicle keeps in a same lane and follows the front vehicle, to reduce driving burden of the driver. Beyond the vehicle speed range (for example, the vehicle speed exceeds 60 km/h), the TJA system automatically exits and cannot be activated.

The ACC system and the TJA system are merely examples for describing a driver assistance system that may be currently configured for the vehicle, and do not constitute any limitation on the protection scope of this application. Another driver assistance system may be further configured for the vehicle, to assist the driver in driving.

It should be understood that each driver assistance system has a fixed vehicle speed range, and a vehicle speed range corresponding to a driver assistance system of each vehicle depends on performance of a sensor (for example, a detection distance and target recognition resolution of a sensor) used by a vehicle manufacturer.

It can be learned from the foregoing description that each driver assistance system has a fixed vehicle speed range of the driver assistance system. Once a vehicle speed is not within a vehicle speed range corresponding to the driver assistance system, the driver assistance system exits lateral and/or longitudinal control of the vehicle. Alternatively, when a vehicle speed does not match a vehicle speed matching a current traffic environment, the driver assistance system cannot provide a high-quality assistance service.

For example, a traffic jam is alleviated, and the front vehicle (a vehicle that is followed by the ego vehicle) has extended a distance from the ego vehicle at a speed higher than 60 km/h. However, a TJA system running on the ego vehicle still keeps running at a speed of 60 km/h. This is prone to cause a security hazard (rear-end collision).

Further, if a vehicle is configured with a plurality of driver assistance systems, settings of vehicle speed ranges in different driver assistance systems configured for the vehicle may be discontinuous. For example, the vehicle is configured with both the ACC system and the TJA system. A maximum vehicle speed of the TJA system is 60 km/h, but a minimum vehicle speed for activating the ACC system is 65 km/h. The ACC system and the TJA system cannot run continuously. When the vehicle runs on a loop or on a highway, the driver assistance system exits frequently, and the driver takes over a driving task. This affects continuity of autonomous driving of the vehicle and causes poor experience.

In addition, if a vehicle is configured with one driver assistance system, when a vehicle speed of the vehicle reaches an upper limit or a lower limit of a vehicle speed range to which the driver assistance system is applied, whether to further accelerate or decelerate and how to further accelerate or decelerate need to be determined and operated by a driver. This also affects autonomous driving performance of the vehicle. For example, the vehicle is configured with the TJA system. A maximum vehicle speed of the TJA system is 60 km/h. When the vehicle speed of the vehicle reaches the maximum vehicle speed 60 km/h of the TJA system, whether the vehicle can further accelerate is determined by the driver based on an ambient environment of the vehicle. The vehicle cannot determine or control the vehicle speed. This affects autonomous driving performance of the vehicle and causes poor experience.

To resolve the problem that driver assistance systems cannot continuously run so that a driver takes over a vehicle, the present disclosure provides a vehicle control method. Vehicle speed control is added between different driver assistance systems, so that the different driver assistance systems are effectively connected, to resolve a problem that system driving is discontinuous because a driver takes over a vehicle when a vehicle speed exceeds a vehicle speed range of a driver assistance system. In addition, when the vehicle speed of the vehicle reaches an upper limit or a lower limit of a vehicle speed range to which a driver assistance system is applied, the vehicle automatically determines and controls the vehicle to accelerate or decelerate, so as to resolve a problem that a driver takes over the vehicle.

The following describes in detail the vehicle control method provided in embodiments of the present disclosure with reference to the accompanying drawings. The vehicle control method provided in the present disclosure is mainly applied to a vehicle configured with at least one driver assistance system, and the vehicle has a V2V communication function. In addition, it should be understood that the vehicle control method provided in the present disclosure may be applied to the scenario shown in FIG. 1, and the V2X scenario may include at least two vehicles.

Figure 2:
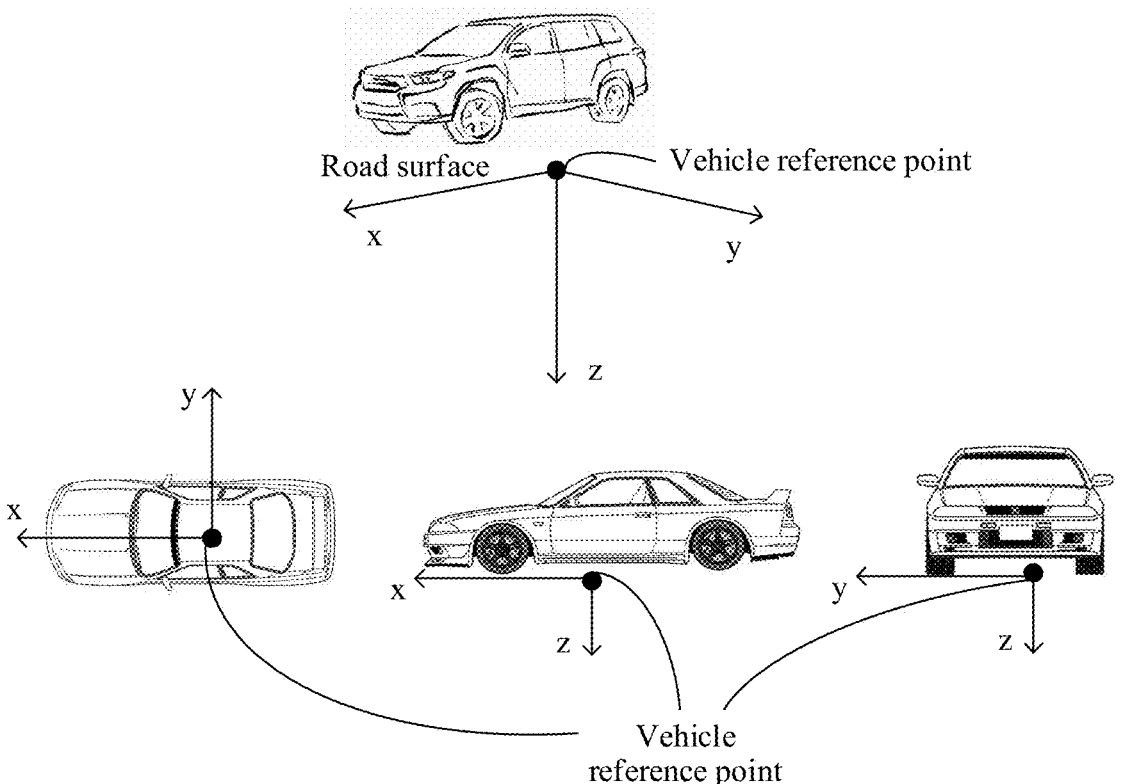
FIG. 2 is a schematic diagram of a movement direction of a vehicle according to an embodiment of the present disclosure.

The driver assistance system configured for the vehicle has a longitudinal and/or lateral control function. Lateral vehicle motion control refers to real-time and continuous vehicle motion control performed on the vehicle along a Y axis (for example, a Y direction in FIG. 2), and longitudinal vehicle motion control refers to real-time and continuous vehicle motion control performed on the vehicle along an X axis (for example, an X direction in FIG. 2). FIG. 2 is a schematic diagram of a movement direction of a vehicle according to an embodiment of this application.

In a possible implementation, a first vehicle in the following embodiment shown in FIG. 3A is configured with a first driver assistance system (for example, a first vehicle is configured with the foregoing ACC system or TJA system).

It should be understood that, in this embodiment of this application, a specific type of the driver assistance system configured for the first vehicle is not limited. The driver assistance system may be a driver assistance system known in the conventional technology, or may be a driver assistance system proposed in the future based on development of a vehicle control technology.

In this implementation, when a vehicle speed matching a driving environment is not within a first vehicle speed range corresponding to the first driver assistance system, the first vehicle may be controlled to terminate an active state of the first driver assistance system that is currently in the active state. Further, in this implementation, the first vehicle may be controlled to run at a vehicle speed beyond the first vehicle speed range.

With reference to FIG. 3A, the following describes in detail how to control the first vehicle in this implementation. FIG. 3A and FIG. 3B are flowcharts of a vehicle control method according to an embodiment of this application. FIG. 3A relates to the first vehicle and a moving object.

In a possible implementation, the moving object may be a pedestrian near the first vehicle.

In another possible implementation, the moving object may be a second vehicle near the first vehicle.

In still another possible implementation, the moving object may be another movable object near the first vehicle.

It should be understood that a specific form of the moving object is not limited in this embodiment of this application, and a quantity of moving objects near the first vehicle is not limited either (there may be one or more moving objects).

In this embodiment of this application, near the first vehicle may be understood as in front of, behind, or on a side of the first vehicle. A specific orientation is not limited in this application, and is subject to that the first vehicle can obtain related information of the moving object.

For ease of understanding, and considering a scenario (V2V) to which this embodiment provided in the present disclosure is likely to be applied, in the following embodiments, an example in which the moving object is the second vehicle is used for description. In other words, FIG. 3A relates to the first vehicle and the second vehicle.

It should be further understood that in this application, information exchange between two vehicles is used as an example for description. A vehicle control method in a scenario with more than two vehicles may be similar to a control method of the first vehicle provided in the following embodiment. An application scenario of the vehicle control method is not described in detail in this application.

The vehicle control method includes at least some of the following steps.

S310a: The first vehicle obtains first information of the second vehicle.

The first information in this embodiment of the present disclosure includes information about a moving object ahead that is obtained by the first vehicle when a vehicle speed of the first vehicle reaches an upper limit or a lower limit of a first vehicle speed range.

Alternatively, in this embodiment of this application, the first vehicle obtains the information about the moving object ahead in real time. Regardless of before the vehicle speed of the first vehicle reaches the upper limit or the lower limit of the first vehicle speed range or when the vehicle speed of the first vehicle reaches the upper limit or the lower limit of the first vehicle speed range, the information about the moving object ahead that is obtained by the first vehicle may be the first information.

It should be understood that, in this embodiment of this application, it is not limited that the first vehicle definitely needs to obtain the information about the moving object ahead in real time. The first vehicle may start to obtain the information about the moving object ahead only when the vehicle speed of the first vehicle approaches the upper limit or the lower limit of the first vehicle speed range, because when the vehicle speed of the first vehicle does not reach the upper limit or the lower limit of the first vehicle speed range, the first driver assistance system controls the first vehicle.

With reference to the existing design of information exchange between vehicles, an example in which the first vehicle obtains the information about the moving object ahead in real time may be used for description in the following embodiments. However, this is not limited in this application.

In addition, in the following embodiments, an example in which the moving object is the second vehicle is used for description. In this case, the first information may also be referred to as information about the second vehicle.

In a possible implementation, the second vehicle sends the information about the second vehicle to the first vehicle. For example, both the first vehicle and the second vehicle have a V2V communication function, and the first vehicle and the second vehicle exchange respective information by using V2V communication units. This implementation may be understood as that the second vehicle sends the information about the second vehicle to the first vehicle, and the V2V communication unit in the first vehicle receives the information about the second vehicle.

In another possible implementation, a sensor disposed on the first vehicle obtains the information about the second vehicle. For example, the sensor may be a radar, and the first vehicle may obtain the information about the second vehicle by using the radar. For another example, the sensor may be a camera, and the first vehicle may obtain the information about the second vehicle by using the camera. This implementation may be understood as that the first vehicle actively obtains the information about the second vehicle.

In still another possible implementation, the first vehicle may obtain the information about the second vehicle by using another vehicle in the system. For example, a third vehicle further exists in the system. The third vehicle can receive the information about the second vehicle, and forward the information about the second vehicle to the first vehicle.

It should be understood that the foregoing several possible implementations are merely examples for describing some possible manners in which the first vehicle obtains the information about the second vehicle, and do not constitute any limitation on the protection scope of this application. The first vehicle may alternatively obtain the information about the second vehicle in another manner. Details are not described herein again.

For example, when the first vehicle obtains the first information, that the first vehicle is controlled by the first driver assistance system may be understood as that the first driver assistance system is in an active state. For example, the first vehicle and the second vehicle can continuously communicate with each other in a running process. When the first vehicle receives the first information, the ACC system controls the first vehicle to keep a proper distance from the second vehicle, so as to reduce labor intensity of a driver.

It should be understood that, that a driver assistance system in this embodiment of the present disclosure is in an active state means that a vehicle configured with the driver assistance system is under automatic control of the driver assistance system, and the vehicle may be controlled without intervention of a driver.

The second vehicle can send the information about the second vehicle to the first vehicle because the second vehicle has the V2V communication function. Optionally, the first vehicle may also send information about the first vehicle to the second vehicle. In this embodiment of this application, an example in which the first vehicle is controlled is mainly used for description. Therefore, whether the first vehicle sends the information about the first vehicle to the second vehicle and how to send the information about the first vehicle to the second vehicle are not limited.

Optionally, that the vehicle in this embodiment of the present disclosure has the V2V communication function may be that the vehicle is equipped with a communication module having the V2V communication function. The communication module may be integrated into a V2X control system, or the communication module may be integrated into a system terminal (for example, a vehicle-mounted device such as a T-BoX) in which the vehicle exchanges in-vehicle information. Refer to a current design of a vehicle having the V2V communication function. This is not limited in this application.

Specifically, in this application, a communication module disposed in the second vehicle is configured to send (or broadcast) related information (for example, a vehicle speed, a location, and vehicle model information) of the second vehicle to the first vehicle (or another vehicle); and a communication module disposed in the first vehicle is configured to receive the information about the second vehicle that is sent by the second vehicle.

In a possible implementation, the second vehicle is a front vehicle in a same lane as the first vehicle.

In another possible implementation, the second vehicle is a vehicle that is about to change lane to a lane of the first vehicle and that is located in front of the first vehicle.

In still another possible implementation, the second vehicle is a vehicle that is about to change lane to an adjacent lane of the lane of the first vehicle and that is located in front of the first vehicle.

It should be understood that a specific location relationship between the first vehicle and the second vehicle is not limited in this embodiment of this application. The second vehicle is a vehicle in front of the first vehicle that may have a collision hazard or does not have a collision hazard.

Further, after obtaining the first information, the first vehicle can determine a first parameter based on the first information. The method procedure shown in FIG. 3A further includes S320a: The first vehicle determines the first parameter.

Further, after determining the first parameter, the first vehicle can terminate, based on the first parameter, the active state of the first driver assistance system that is currently in the active state. In this case, the method procedure shown in FIG. 3A further includes S330a: The first vehicle terminates the first driver assistance system.

For example, that the first vehicle terminates, based on the first parameter, the active state of the first driver assistance system that is currently in the active state includes: If the first vehicle determines, based on the first parameter, that there is no intersection between a safe driving speed range of the first vehicle and the first vehicle speed range, the first vehicle may terminate the first driver assistance system in the active state, that is, the first driver assistance system exits the active state and switches to an inactive state. The safe driving speed range of the first vehicle indicates a speed range to which a driving speed of the first vehicle belongs when there is no hazard of collision between the first vehicle and the second vehicle.

After the first driver assistance system is terminated, the first vehicle can set, based on the first parameter, the first vehicle to run at a first vehicle speed beyond the first vehicle speed range. In this case, the method procedure shown in FIG. 3A further includes S340a: Set the first vehicle to run at the first vehicle speed.

Further, that the first vehicle sets, based on the first parameter, the first vehicle to run at a first vehicle speed beyond the first vehicle speed range includes: The first vehicle sets, based on the first parameter, the first vehicle to run at a vehicle speed within the safe driving speed range.

In a possible implementation, the first parameter indicates the safe driving speed range that the first vehicle is supposed to have when there is no hazard of collision between the first vehicle and the second vehicle. In this implementation, the safe driving speed range of the first vehicle may be determined based on whether there is a hazard of collision between the first vehicle and the second vehicle, and whether there is a hazard of collision between the first vehicle and the second vehicle may be determined based on the first information.

For example, the first driver assistance system is the ACC system, and the applied first vehicle speed range is 65 km/h to 120 km/h.

When the vehicle speed of the first vehicle reaches 65 km/h, the first vehicle determines, based on the first information, that to avoid a hazard of collision between the first vehicle and the second vehicle, the driving speed of the first vehicle should be less than 65 km/h. It may be understood that the first vehicle obtains the first information when the vehicle speed of the first vehicle reaches 65 km/h, and determines, based on the first information, that if the first vehicle runs at 65 km/h, the first vehicle may collide with the second vehicle. In this case, the first vehicle further determines, based on the first information, that the first vehicle needs to decelerate and continue to run at a first vehicle speed lower than 65 km/h, to avoid a collision. In this case, the first vehicle terminates, based on the first parameter, the active state of the ACC system that is currently in the active state, and sets, based on the first parameter, the first vehicle to run at a vehicle speed less than 65 km/h.

In another possible implementation, the first parameter includes a parameter used to determine whether there is a hazard of collision between the first vehicle and the moving object. When there is no hazard of collision between the first vehicle and the moving object, a driving speed range of the first vehicle includes the safe driving speed range.

In this implementation, the determining first parameter based on the first information may be that the first vehicle obtains the first parameter through calculation based on the obtained first information, or may be that the first vehicle obtains the first parameter through table lookup based on the obtained first information. The following briefly describes how to obtain the first parameter through calculation based on the first information.

Specifically, based on different information about the second vehicle included in the first information, the first parameter obtained by the first vehicle through calculation includes the following two possibilities.

Possibility 1:

If the first information includes vehicle speed information of the second vehicle and location information of the second vehicle, the first parameter includes an estimated time to collision (TTC) of the first vehicle and the second vehicle. It should be understood that the TTC parameter varies with time. In other words, the first vehicle continuously calculates the TTC. To reflect a property that the TTC varies with time, the parameter TTC is denoted as TTC(t) in this application.

Figure 4A:
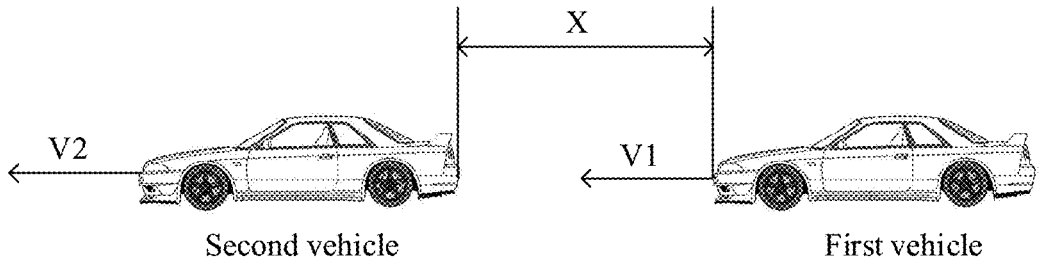
FIG. 4A is a schematic diagram of a scenario of calculating a first parameter according to an embodiment of the present disclosure.
Figure 4B:
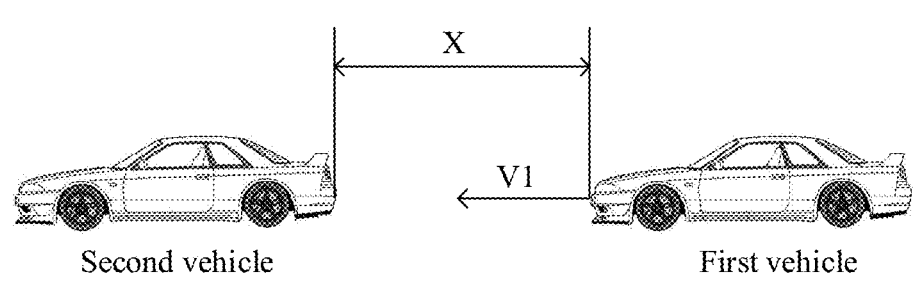
FIG. 4B is a schematic diagram of a scenario of calculating a first parameter according to an embodiment of the present disclosure.

FIG. 4 is a schematic diagram of a scenario of calculating a first parameter according to an embodiment of this application. Specifically, based on the scenario shown in FIG. 4A, that the first vehicle calculates the first parameter includes the following procedures.

The first vehicle learns of a vehicle speed of the second vehicle based on the vehicle speed information of the second vehicle included in the first information. The first vehicle calculates a relative vehicle speed $(V1(t)-V2(t))$ between the first vehicle and the second vehicle based on the vehicle speed of the second vehicle and the vehicle speed of the first vehicle.

The first vehicle may further learn of a location of the second vehicle based on the location information of the second vehicle included in the first information. The first vehicle calculates an inter-vehicle distance $(X(t))$ between the first vehicle and the second vehicle based on the location of the second vehicle and a location of the first vehicle.

After obtaining the relative vehicle speed between the first vehicle and the second vehicle and the inter-vehicle distance between the first vehicle and the second vehicle, the first vehicle can calculate the TTC(t) based on the relative vehicle speed between the first vehicle and the second vehicle and the inter-vehicle distance between the first vehicle and the second vehicle as follows: $TTC(t)=X(t)/(V1(t)-V2(t))$.

Possibility 2:

If the first information includes location information of the second vehicle, the first parameter includes a time interval (TI) of the first vehicle and the second vehicle. It should be understood that the TI parameter varies with time. In other words, the first vehicle continuously calculates the TI. To reflect a property that the TI varies with time, the parameter TI is denoted as TI(t) in this application. Specifically, based on the scenario shown in FIG. 4B4B, that the first vehicle calculates the first parameter includes the following procedures.

The first vehicle may further learn of a location of the second vehicle based on the location information of the second vehicle included in the first information. The first vehicle calculates an inter-vehicle distance between the first vehicle and the second vehicle based on the location of the second vehicle and a location of the first vehicle.

After obtaining the inter-vehicle distance between the first vehicle and the second vehicle, the first vehicle can calculate the TI(t) based on the inter-vehicle distance (X(t)) between the first vehicle and the second vehicle and the vehicle speed (V1(t)) of the first vehicle as follows: TI(t)=V1(t)/X(t).

It should be understood that the first information may further include other information in the possibility 1 and/or the possibility 2. The foregoing description merely indicates that when the first information includes the location information of the second vehicle and the vehicle speed information of the second vehicle, TTC(t) may be obtained through calculation, and when the information about the second vehicle includes the location information of the second vehicle, TI(t) may be obtained through calculation. Whether the information about the second vehicle includes other information or whether the first parameter may be in another form is not limited in this application. For example, the first parameter may also be TI(t) in the possibility 1. For another example, the information about the second vehicle may further include vehicle model information (such as a vehicle size) of the second vehicle.

It should be understood that, in a process in which the first vehicle runs at the first vehicle speed beyond the first vehicle speed range, the first vehicle can obtain updated first information, and determine an updated first parameter based on the updated first information. The method procedure shown in FIG. 3A further includes S350a: The first vehicle obtains the updated first information; and S360a: The first vehicle determines the updated first parameter.

For example, after the first vehicle determines the updated first parameter, the first vehicle sets, based on the updated first parameter, the first vehicle to run at a second vehicle speed within the first vehicle speed range. That is, the method procedure shown in FIG. 3A further includes S370a: Set the first vehicle to run at the second vehicle speed.

That the first vehicle sets, based on the updated first parameter, the first vehicle to run at a second vehicle speed within the first vehicle speed range includes the following:

The first vehicle determines that there is an intersection between the safe driving speed range and the first vehicle speed range.

The first vehicle sets the first vehicle to run at the second vehicle speed in the intersection between the safe driving speed range and the first vehicle speed range.

It should be understood that, that the first vehicle runs at the second vehicle speed within the first vehicle speed range indicates that the first vehicle can reactivate the first driver assistance system based on the updated first parameter. That is, the method procedure shown in FIG. 3A further includes S380a: The first vehicle reactivates the first driver assistance system.

Specifically, the first vehicle reactivates the first driver assistance system in the following several possible manners.

Manner 1:

Corresponding to the possibility 1 in S320a, the first parameter is TTC(t), and the first vehicle is configured with the foregoing first driver assistance system.

When the TTC(t) is a non-positive number or the TTC(t) is greater than a first preset threshold, the first driver assistance system controls the first vehicle to accelerate. When the vehicle speed reaches the upper limit of the first vehicle speed range, the first vehicle determines, based on the TTC(t), that there is no hazard of collision between the first vehicle and the second vehicle. If the first vehicle determines that the safe driving speed range of the first vehicle exceeds the first vehicle speed range, the first vehicle indicates the first driver assistance system to exit, and controls the first vehicle to continue to accelerate to run at the first vehicle speed beyond the first vehicle speed range. In a process in which the first vehicle runs at the first vehicle speed beyond the first vehicle speed range, the first vehicle may obtain the updated first information, determine the updated first parameter based on the updated first information, and then control, based on the updated first parameter (for example, the updated first parameter indicates that there is a hazard of collision between the first vehicle and the second vehicle, and the first vehicle may determine that the vehicle speed of the first vehicle is within the first vehicle speed range), the first vehicle to decelerate, so that the vehicle speed of the first vehicle returns to the first vehicle speed range, and the first driver assistance system is in a running state again.

For example, the first driver assistance system is the TJA system (an applied vehicle speed range is 0 km/h to 60 km/h). When the vehicle speed reaches 60 km/h, the first vehicle determines, based on the first parameter, that there is no hazard of collision, determines that a vehicle speed range in which the first vehicle can run is greater than 60 km/h, indicates the first driver assistance system to exit, controls the first vehicle to continue to accelerate, and sets the first vehicle to run at a vehicle speed beyond 0 km/h to 60 km/h. In a process in which the first vehicle runs at the vehicle speed beyond 0 km/h to 60 km/h, the first vehicle may obtain the updated first information, and determine the updated first parameter based on the updated first information. If the updated first parameter indicates that there is a hazard of collision between the first vehicle and the second vehicle, the first vehicle is supposed to run at a vehicle speed within 0 km/h to 60 km/h. In this case, the first vehicle makes the vehicle speed of the first vehicle return to 60 km/h, and reactivates the TJA system.

Optionally, the first preset threshold includes a value of TTC(t) when there is a hazard of collision between the first vehicle and the second vehicle.

Optionally, the first preset threshold includes a value greater than the value of TTC(t) when there is a hazard of collision between the first vehicle and the second vehicle.

Optionally, the first preset threshold includes another preset value. An example is not described herein. What only needs to be limited is that when the calculated TTC is greater than the first preset threshold, there is no hazard of collision between the first vehicle and the second vehicle.

Manner 2:

Corresponding to the possibility 1 in S320, the first parameter is TTC(t), and the first vehicle is configured with the foregoing first driver assistance system.

When the TTC(t) is a positive number less than or equal to the first preset threshold, the first driver assistance system controls the first vehicle to decelerate. When the vehicle speed reaches the lower limit of the first vehicle speed range, the first vehicle determines, based on the TTC(t), that there is a hazard of collision between the first vehicle and the second vehicle. If the first vehicle determines that the safe driving speed range of the first vehicle is lower than the first vehicle speed range, the first vehicle indicates the first driver assistance system to exit, and controls the first vehicle to continue to decelerate to run at the first vehicle speed lower than the first vehicle speed range. In a process in which the first vehicle runs at the first vehicle speed lower than the first vehicle speed range, the first vehicle may obtain the updated first information, determine the updated first parameter based on the updated first information, and then control, based on the updated first parameter (for example, the updated first parameter indicates that there is no hazard of collision between the first vehicle and the second vehicle, and the first vehicle may determine that the vehicle speed of the first vehicle is within the first vehicle speed range), the first vehicle to accelerate, so that the vehicle speed of the first vehicle returns to the first vehicle speed range, and the first driver assistance system is in a running state again.

For example, the first driver assistance system is the ACC system (an applied vehicle speed range is 65 km/h to 120 km/h). When the vehicle speed reaches 65 km/h, the first vehicle determines, based on the first parameter, that there is a hazard of collision, determines that a vehicle speed range in which the first vehicle can run is less than 65 km/h, indicates the first driver assistance system to exit, controls the first vehicle to continue to decelerate, and sets the first vehicle to run at a vehicle speed beyond 65 km/h to 120 km/h. In a process in which the first vehicle runs at the vehicle speed beyond 65 km/h to 120 km/h, the first vehicle may obtain the updated first information, and determine the updated first parameter based on the updated first information. If the updated first parameter indicates that there is no hazard of collision between the first vehicle and the second vehicle, the first vehicle is supposed to run at a vehicle speed within 65 km/h to 120 km/h. In this case, the first vehicle makes the vehicle speed of the first vehicle return to 65 km/h, and reactivates the ACC system.

Manner 3:

Corresponding to the possibility 2 in S320a, the first parameter is TI(t), and the first vehicle is configured with the foregoing first driver assistance system.

When the TI(t) is greater than a second preset threshold, the first driver assistance system controls the first vehicle to accelerate. When the vehicle speed reaches the upper limit of the first vehicle speed range, the first vehicle determines, based on the TI(t), that there is no hazard of collision between the first vehicle and the second vehicle. If the first vehicle determines that the safe driving speed range of the first vehicle exceeds the first vehicle speed range, the first vehicle indicates the first driver assistance system to exit, and controls the first vehicle to continue to accelerate to run at the first vehicle speed beyond the first vehicle speed range. In a process in which the first vehicle runs at the first vehicle speed lower than the first vehicle speed range, the first vehicle may obtain the updated first information, determine the updated first parameter based on the updated first information, and then control, based on the updated first parameter (for example, the first parameter indicates that there is a hazard of collision between the first vehicle and the second vehicle, and the first vehicle may determine that the vehicle speed of the first vehicle is within the first vehicle speed range), the first vehicle to decelerate, so that the vehicle speed of the first vehicle returns to the first vehicle speed range, and the first driver assistance system is in a running state again.

Optionally, the second preset threshold includes a value of TI(t) when there is a hazard of collision between the first vehicle and the second vehicle.

Optionally, the second preset threshold includes a value greater than the value of TI(t) when there is a hazard of collision between the first vehicle and the second vehicle.

Optionally, the second preset threshold includes another preset value. An example is not described herein. What only needs to be limited is that when the calculated TI is greater than the second preset threshold, there is no hazard of collision between the first vehicle and the second vehicle.

Manner 4:

Corresponding to the possibility 2 in S320a, the first parameter is TI(t), and the first vehicle is configured with the foregoing first driver assistance system.

When the TI(t) is less than or equal to the second preset threshold, the first driver assistance system controls the first vehicle to decelerate. When the vehicle speed reaches the lower limit of the first vehicle speed range, the first vehicle determines, based on the TI(t), that there is a hazard of collision between the first vehicle and the second vehicle. If the first vehicle determines that the safe driving speed range of the first vehicle is lower than the first vehicle speed range, the first vehicle indicates the first driver assistance system to exit, and controls the first vehicle to continue to decelerate to run at the first vehicle speed lower than the first vehicle speed range. In a process in which the first vehicle runs at the first vehicle speed lower than the first vehicle speed range, the first vehicle may obtain the updated first information, determine the updated first parameter based on the updated first information, and then control, based on the updated first parameter (for example, the first parameter indicates that there is no hazard of collision between the first vehicle and the second vehicle, and the first vehicle may determine that the vehicle speed of the first vehicle is within the first vehicle speed range), the first vehicle to accelerate, so that the vehicle speed of the first vehicle returns to the first vehicle speed range, and the first driver assistance system is in a running state again.

Manner 1 to Manner 4 describe content that when the first vehicle is configured with the first driver assistance system, when the vehicle speed of the first vehicle reaches the upper limit or the lower limit of the first vehicle speed range to which the first driver assistance system is applied, the first vehicle may terminate the first driver assistance system based on the first parameter, and set the first vehicle to run at the first vehicle speed beyond the first vehicle speed range. Further, in a process in which the first vehicle runs at the first vehicle speed beyond the first vehicle speed range, the first vehicle may obtain the updated first parameter, reactivate the first driver assistance system based on the updated first parameter, and set the first vehicle to run at the second vehicle speed within the first vehicle speed range. In this process, the driver does not need to take over the vehicle. This improves autonomous driving performance of the vehicle.

It should be understood that Manner 1 to Manner 4 indicate that the first vehicle can reactivate the configured first driver assistance system based on the updated first parameter. When the first vehicle is configured with a plurality of driver assistance systems, the first vehicle may activate, based on the updated first parameter, a driver assistance system in the plurality of configured driver assistance systems. The following provides description with reference to FIG. 3B.

In another possible implementation, the first vehicle in the following embodiment shown in FIG. 3B is configured with two or more driver assistance systems. It is assumed that the first vehicle is configured with the first driver assistance system and a second driver assistance system (for example, the first vehicle is configured with the ACC system and the TJA system), and there is no intersection between the first vehicle speed range to which the first driver assistance system is applied and a second vehicle speed range to which the second driver assistance system is applied.

For example, if the first driver assistance system is the ACC system, 65 km/h≤first vehicle speed range≤120 km/h. If the second driver assistance system is the TJA system, 0 km/h≤second vehicle speed range≤60 km/h. Alternatively, if the first driver assistance system is the TJA system, 0 km/h≤first vehicle speed range≤60 km/h. If the second driver assistance system is the ACC system, 65 km/h≤second vehicle speed range≤120 km/h.

It should be understood that in this implementation, in this embodiment of this application, specific types of the two driver assistance systems configured for the first vehicle are not limited. The driver assistance system may be a driver assistance system known in the conventional technology, or may be a driver assistance system proposed in the future based on development of a vehicle control technology.

In addition, in this implementation, vehicle speed ranges to which the first driver assistance system and the second driver assistance system are separately applied are not limited, and it is only limited that there is no intersection between the vehicle speed ranges to which the first driver assistance system and the second driver assistance system are separately applied, that is, continuous running of the two driver assistance systems cannot be implemented directly. It may be understood that, when there is an intersection between the vehicle speed ranges to which the first driver assistance system and the second driver assistance system are separately applied, when a vehicle speed of a vehicle falls within a vehicle speed range covered by the intersection, a conflict between different driver assistance systems may be caused, and a safety problem is caused.

It should be further understood that in this implementation, in this embodiment of this application, a specific quantity of driver assistance systems configured in the first vehicle is not limited, and there may be two or more driver assistance systems. For ease of description, an example in which two driver assistance systems (the first driver assistance system and the second driver assistance system) are configured in the first vehicle is used for description in this embodiment of this application. When at least two driver assistance systems are configured in the first vehicle, for how to implement continuity between different driver assistance systems, refer to the following solution for implementing continuity between the first driver assistance system and the second driver assistance system. A case in which at least two driver assistance systems are configured in the first vehicle is not described in detail in this application.

With reference to FIG. 3B, the following describes in detail how to control the first vehicle in this implementation. FIG. 3B relates to the first vehicle and a moving object.

It should be understood that the moving object in the embodiment corresponding to FIG. 3B is similar to the moving object in the embodiment corresponding to FIG. 3A. Details are not described herein again. Similar to the embodiment corresponding to FIG. 3A, the moving object in the embodiment corresponding to FIG. 3B is described by using the second vehicle in front of the first vehicle as an example.

The vehicle control method includes at least some of the following steps.

S310*b*: The first vehicle obtains first information of the second vehicle. This is similar to S310*a*, and details are not described herein again.

Further, after obtaining the first information, the first vehicle can determine a first parameter based on the first information. The method procedure shown in FIG. 3B further includes S320*b*: The first vehicle determines the first parameter. This is similar to S320*a*, and details are not described herein again.

In a possible implementation, the first vehicle can terminate, based on the first parameter, an active state of the first driver assistance system that is currently in the active state, and set, based on the first parameter, the first vehicle to run at a first vehicle speed beyond the first vehicle speed range. In this implementation, after determining the first parameter, the first vehicle can terminate, based on the first parameter, the active state of the first driver assistance system that is currently in the active state. In this case, the method procedure shown in FIG. 3B further includes S330*b*: The first vehicle terminates the first driver assistance system. This is similar to S330*a*, and details are not described herein again.

After the first driver assistance system is terminated, the first vehicle can set, based on the first parameter, the first vehicle to run at the first vehicle speed beyond the first vehicle speed range. In this case, the method procedure shown in FIG. 3B further includes S340*b*: Set the first vehicle to run at the first vehicle speed. This is similar to S340*a*, and details are not described herein again.

In another possible implementation, the first vehicle can maintain, based on the first parameter, the active state of the first driver assistance system that is currently in the active state, and set, based on the first parameter, the first vehicle to run at a vehicle speed within the first vehicle speed range. In this implementation, after determining the first parameter, the first vehicle can maintain, based on the first parameter, the active state of the first driver assistance system that is currently in the active state.

It should be understood that, in a process in which the first vehicle runs at the first vehicle speed beyond the first vehicle speed range, the first vehicle can obtain updated first information, and determine an updated first parameter based on the updated first information. The method procedure shown in FIG. 3B further includes S350*b*: The first vehicle obtains the updated first information; and S360*b*: The first vehicle determines the updated first parameter.

For example, after the first vehicle determines the updated first parameter, the first vehicle sets, based on the updated first parameter, the first vehicle to run at a second vehicle speed within the second vehicle speed range. That is, the method procedure shown in FIG. 3B further includes S370*a*: Set the first vehicle to run at the second vehicle speed.

That the first vehicle sets, based on the updated first parameter, the first vehicle to run at a second vehicle speed within the second vehicle speed range includes the following:

The first vehicle determines that there is an intersection between a safe driving speed range and the second vehicle speed range.

The first vehicle sets the first vehicle to run at the second vehicle speed in the intersection between the safe driving speed range and the second vehicle speed range.

It should be understood that, that the first vehicle runs at the second vehicle speed within the second vehicle speed range indicates that the first vehicle can activate the second driver assistance system based on the updated first parameter. That is, the method procedure shown in FIG. 3B further includes S380*b*: The first vehicle activates the second driver assistance system.

In the embodiment shown in FIG. 3B, the first vehicle can control, based on the first parameter, the first driver assistance system to maintain a running state, or when a vehicle speed of the first vehicle reaches an upper limit of the first vehicle speed range or a lower limit of the first vehicle speed range, the first vehicle may further determine, based on the first parameter, whether there is a hazard of collision between the first vehicle and the second vehicle. If the first vehicle determines that the safe driving speed range of the first vehicle is not within the first vehicle speed range, the first vehicle terminates the active state of the first driver assistance system, controls the first vehicle to accelerate or decelerate to run at the first vehicle speed beyond the first vehicle speed range, and makes, based on the updated first parameter, the vehicle speed of the first vehicle reach an upper limit of the second vehicle speed range or a lower limit of the second vehicle speed range, to activate the second driver assistance system.

To be specific, in the vehicle control method shown in FIG. 3B, a driver does not need to frequently take over and control the vehicle. The first vehicle can terminate the active state of the first driver assistance system, and automatically control the vehicle speed of the first vehicle, so that the vehicle speed of the first vehicle reaches the upper limit or the lower limit of the second vehicle speed range corresponding to the second driver assistance system. In this way, the second driver assistance system takes over control of the first vehicle. In this procedure, there is no driver intervention, and autonomous driving continuity is improved.

Specifically, corresponding to the foregoing possibilities of the first parameter, the first vehicle controls the first vehicle in the following several manners:

Manner 1:

Corresponding to the possibility 1 in S320, the first parameter is TTC(t).

When the TTC(t) is a non-positive number or the TTC(t) is greater than a first preset threshold, and the lower limit of the first vehicle speed range is greater than the upper limit of the second vehicle speed range, the first vehicle controls, based on the TTC(t), the first driver assistance system to maintain the active state.

It should be understood that, when the TTC(t) is a non-positive number (for example, V1(t)−V2(t) is 0 or a negative number), it indicates that the vehicle speed of the first vehicle is less than or equal to a vehicle speed of the second vehicle. Since no collision occurs currently, when the vehicle speed of the first vehicle is less than or equal to the vehicle speed of the second vehicle, a collision is not likely to occur. It is considered that when the TTC(t) is a non-positive number, there is no hazard of collision between the first vehicle and the second vehicle.

It can be learned from the foregoing description that when the TTC(t) is a non-positive number or the TTC(t) is greater than the first preset threshold, there is no hazard of collision between the first vehicle and the second vehicle. When the lower limit of the first vehicle speed range is greater than the upper limit of the second vehicle speed range, there is no intersection between the first vehicle speed range to which the first driver assistance system is applied and the second vehicle speed range to which the second driver assistance system is applied, and the lower limit of the first vehicle speed range to which the first driver assistance system is applied is greater than the upper limit of the second vehicle speed range to which the second driver assistance system is applied.

For example, the first driver assistance system is the ACC system (the applied first vehicle speed range is 65 km/h to 120 km/h), and the second driver assistance system is the TJA system (the applied second vehicle speed range is 0 km/h to 60 km/h). For ease of description, in Manner 1, an example in which the first driver assistance system is the ACC system and the second driver assistance system is the TJA system is used for description.

Figure 5:
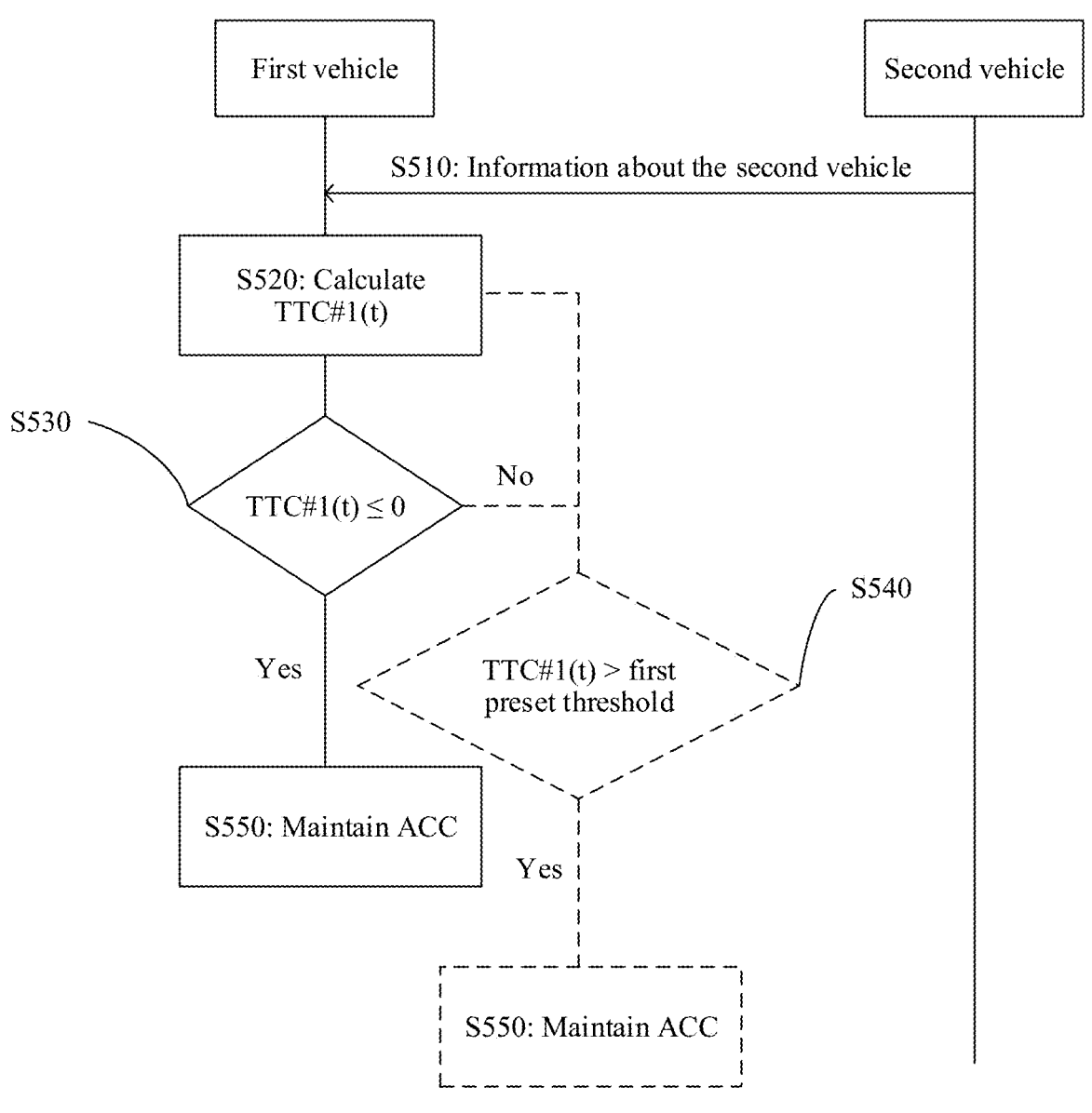
FIG. 5 is a flowchart of a method for controlling a first vehicle according to an embodiment of the present disclosure.

FIG. 5 is a flowchart of controlling a first vehicle according to an embodiment of this application. Specifically, in Manner 1, a specific procedure in which the first vehicle controls the first vehicle based on a first parameter includes the following:

S510: The first vehicle obtains information about a second vehicle.

The information about the second vehicle includes vehicle speed information of the second vehicle and location information of the second vehicle.

S520: The first vehicle calculates TTC #1(t).

The first vehicle calculates a relative speed v #1(t) of the first vehicle and the second vehicle based on a vehicle speed of the second vehicle and a vehicle speed of the first vehicle, and the first vehicle calculates an inter-vehicle distance x #1(t) between the first vehicle and the second vehicle based on a location of the second vehicle and a location of the first vehicle, where TTC #1(t)=x #1(0/v #1(t).

S530: The first vehicle determines whether the TTC #1(t) is a non-positive number.

In Manner 1, the TTC #1(t) may be a non-positive number.

S540: The first vehicle determines whether the TTC #1(t) is greater than a first preset threshold.

In Manner 1, the TTC #1(t) may be a value greater than the first preset threshold.

It should be understood that S540 may be performed after S520 is performed, or S540 may be performed after S530 is performed (for example, when a determining result is No in S530). This is not limited in this embodiment.

S550: The ACC maintains an active state.

In Manner 1, a moving speed of the first vehicle is maintained within a first vehicle speed range to which the ACC is applied.

For example, the first vehicle may accelerate, but a speed range is not greater than 120 km/h.

It should be understood that, in a running process, the first vehicle may obtain updated information about the second vehicle, determine, based on the obtained updated information about the second vehicle, whether a collision is to occur, and control the first vehicle based on a determining result.

Manner 2:

Corresponding to the possibility 1 in S320, the first parameter is TTC(t).

When the TTC(t) is a non-positive number or the TTC(t) is greater than the first preset threshold, and an upper limit of the first vehicle speed range is less than a lower limit of the second vehicle speed range, the first driver assistance system controls the first vehicle to accelerate. When the vehicle speed reaches the upper limit of the first vehicle speed range, the first vehicle determines, based on the TTC(t), that there is no hazard of collision between the first vehicle and the second vehicle. If the first vehicle determines that a safe driving speed range of the first vehicle exceeds the first vehicle speed range, the first vehicle indicates the first driver assistance system to exit, and controls the first vehicle to continue to accelerate to run at a first vehicle speed beyond the first vehicle speed range.

In a process in which the first vehicle runs at the first vehicle speed beyond the first vehicle speed range, the first vehicle may obtain updated first information, determine an updated first parameter based on the updated first information, and then control, based on the updated first parameter (for example, the updated first parameter indicates that there is no hazard of collision between the first vehicle and the second vehicle, and the first vehicle may determine that the vehicle speed of the first vehicle is within the second vehicle speed range), the first vehicle to accelerate, so that the vehicle speed of the first vehicle reaches the lower limit of the second vehicle speed range, to activate a second driver assistance system.

Similar to that described in Manner 1, when the TTC(t) is a non-positive number or the TTC(t) is greater than the first preset threshold, there is no hazard of collision between the first vehicle and the second vehicle. When the upper limit of the first vehicle speed range is less than the lower limit of the second vehicle speed range, there is no intersection between the first vehicle speed range to which the first driver assistance system is applied and the second vehicle speed range to which the second driver assistance system is applied, and the upper limit of the first vehicle speed range to which the first driver assistance system is applied is greater than the lower limit of the second vehicle speed range to which the second driver assistance system is applied.

For example, the first driver assistance system is the TJA system (the applied first vehicle speed range is 0 km/h to 60 km/h), and the second driver assistance system is the ACC system (the applied second vehicle speed range is 65 km/h to 120 km/h). For ease of description, in Manner 2, an example in which the first driver assistance system is the TJA system and the second driver assistance system is the ACC system is used for description.

Figure 6:
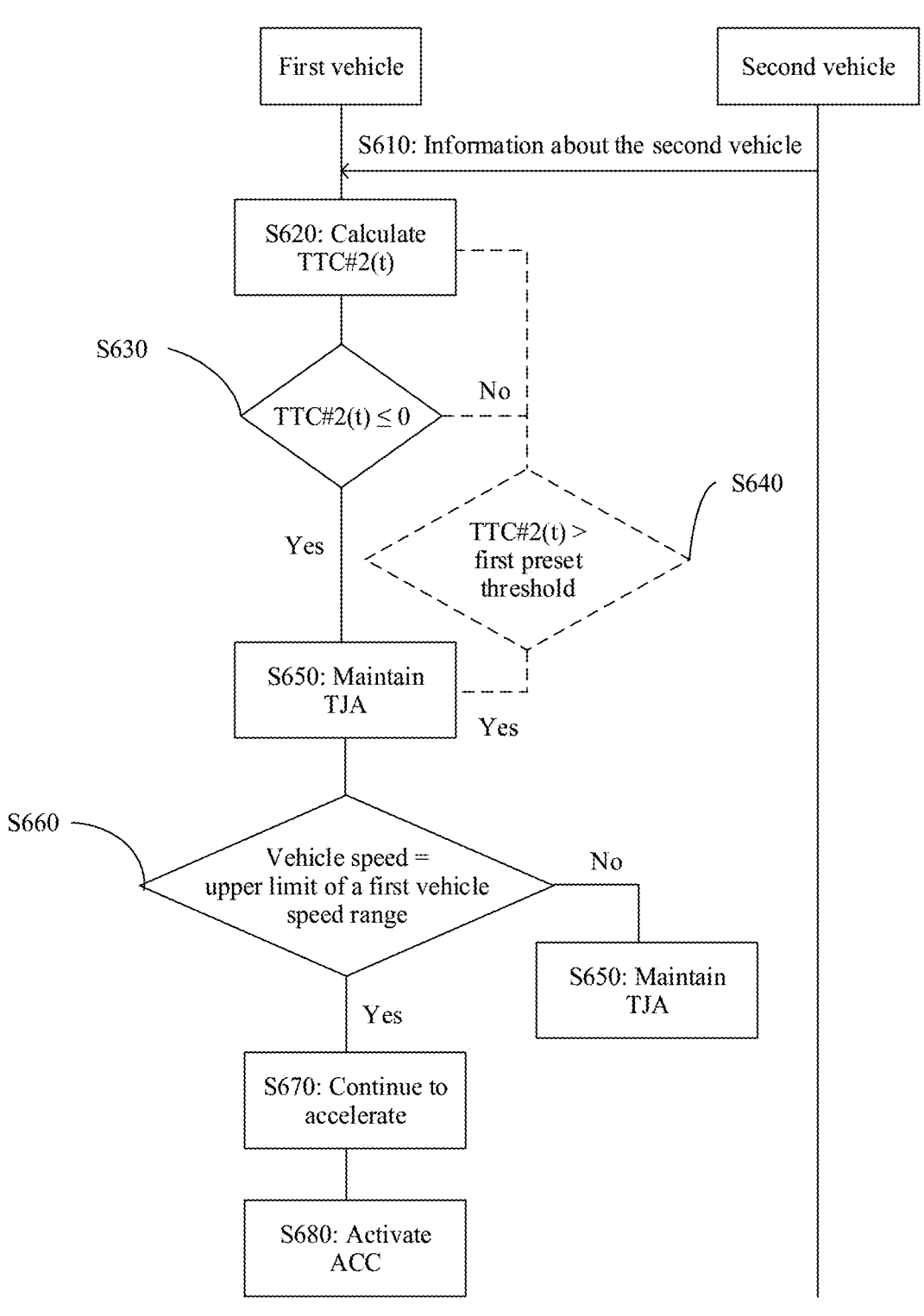
FIG. 6 is a flowchart of another method for controlling a first vehicle according to an embodiment of the present disclosure.

FIG. 6 is another flowchart of controlling a first vehicle according to an embodiment of this application. Specifically, in Manner 2, a specific procedure in which the first vehicle controls the first vehicle includes the following:

S610: The first vehicle obtains information about a second vehicle.

The information about the second vehicle includes vehicle speed information of the second vehicle and location information of the second vehicle.

S620: The first vehicle calculates TTC #2(t).

The first vehicle calculates a relative speed v #2(t) of the first vehicle and the second vehicle based on a vehicle speed of the second vehicle and a vehicle speed of the first vehicle, and the first vehicle calculates an inter-vehicle distance x #2(t) between the first vehicle and the second vehicle based on a location of the second vehicle and a location of the first vehicle, where TTC #2(t)=x #2(t)/v #2(t).

S630: The first vehicle determines whether the TTC #2(t) is a non-positive number.

In Manner 2, the TTC #2(t) may be a non-positive number.

S640: The first vehicle determines whether the TTC #2(t) is greater than a first preset threshold.

In Manner 2, the TTC #2(t) may be a value greater than the first preset threshold.

It should be understood that S640 may be performed after S620 is performed, or S640 may be performed after S630 is performed (for example, when a determining result is No in S630). This is not limited in this embodiment.

When the TTC #2(t) is a non-positive number or is greater than the first preset threshold, TJA controls the first vehicle to accelerate. That is, the procedure shown in FIG. 6 further includes S650: Maintain the TJA.

S660: Determine whether the vehicle speed of the first vehicle reaches an upper limit of a first vehicle speed range.

S670: When the vehicle speed of the first vehicle reaches the upper limit of the first vehicle speed range, the first vehicle determines, based on the TTC #2(t), that there is no hazard of collision, and indicates a first driver assistance system to exit a running state. The first vehicle controls, based on the TTC #2(t), the first vehicle to continue to accelerate, so that the vehicle speed of the first vehicle reaches a lower limit of a second vehicle speed range, to activate a second driver assistance system. That is, the procedure shown in FIG. 6 further includes S680: Activate ACC.

It should be understood that, when the first vehicle accelerates and the speed reaches the upper limit of the first vehicle speed range, the first vehicle determines, based on the TTC #2(t), that there is still no hazard of collision, and the first driver assistance system exits. According to a current design of a vehicle control system, when the vehicle speed of the first vehicle reaches the upper limit of the first vehicle speed range and a driver determines that there is no hazard of collision, the driver takes over the first vehicle to accelerate.

In Manner 2, when the first driver assistance system controls the first vehicle to accelerate and the speed reaches the upper limit of the first vehicle speed range, the first vehicle determines, based on the TTC #2(t), that there is still no hazard of collision, the first driver assistance system exits the running state, and a control system (for example, may be referred to as a V2X control system) in the vehicle takes over the first vehicle to continue to accelerate, so that the vehicle speed of the first vehicle reaches the lower limit of the second vehicle speed range, to activate the second driver assistance system.

Specifically, when the vehicle speed of the first vehicle reaches the lower limit of the second vehicle speed range, the second driver assistance system is activated, and the second driver assistance system takes over the first vehicle.

In the foregoing procedure, the driver does not need to take over the first vehicle. When the first vehicle determines that there is no hazard of collision, the first driver assistance system controls the first vehicle to accelerate, and continues to monitor, in an acceleration process, whether there is a hazard of collision with the second vehicle. When the first driver assistance system controls the first vehicle to accelerate and the speed reaches the upper limit of the first vehicle speed range to which the first driver assistance system is applied, if there is still no hazard of collision between the first vehicle and the second vehicle, the first driver assistance system exits, and a control system (for example, may be referred to as a V2X control system) in the first vehicle controls the first vehicle to continue to accelerate. When the vehicle speed of the first vehicle reaches the lower limit of the second vehicle speed range, the second driver assistance system is activated, and the second driver assistance system takes over the first vehicle.

Optionally, in a process in which the control system controls the first vehicle to continue to accelerate, the first vehicle continues to monitor whether there is a hazard of collision with the second vehicle. When there is a hazard of collision between the first vehicle and the second vehicle, the control system controls the first vehicle to decelerate, so that the vehicle speed of the first vehicle reaches the upper limit of the first vehicle speed range, and the first driver assistance system is reactivated.

It should be understood that, in this embodiment of this application, how the control system improves continuity of switching between the first driver assistance system and the second driver assistance system is mainly described. A specific vehicle speed control function of the control system is not described in detail. It should be noted that the control system can continuously control a vehicle speed based on the first parameter.

Manner 3:

Corresponding to the possibility 1 in S320, the first parameter is TTC(t).

When the TTC(t) is less than or equal to the first preset threshold, and a lower limit of the first vehicle speed range is greater than an upper limit of the second vehicle speed range, the first driver assistance system controls the first vehicle to decelerate. When the vehicle speed reaches the lower limit of the first vehicle speed range, the first vehicle determines, based on the TTC(t), that there is a hazard of collision between the first vehicle and the second vehicle. If the first vehicle determines that the safe driving speed range of the first vehicle is less than the first vehicle speed range, the first vehicle indicates the first driver assistance system to exit, and controls the first vehicle to continue to decelerate to run at a first vehicle speed lower than the first vehicle speed range.

In a process in which the first vehicle runs at the first vehicle speed lower than the first vehicle speed range, the first vehicle may obtain updated first information, determine an updated first parameter based on the updated first information, and then control, based on the updated first parameter (for example, the updated first parameter indicates that there is no hazard of collision between the first vehicle and the second vehicle, and the first vehicle may determine that the vehicle speed of the first vehicle is within the second vehicle speed range), the first vehicle to continue to decelerate, so that the vehicle speed of the first vehicle reaches the lower limit of the second vehicle speed range, to activate a second driver assistance system.

Similar to that described in Manner 1, when the TTC(t) is greater than the first preset threshold, there is no hazard of collision between the first vehicle and the second vehicle. When the TTC(t) is less than or equal to the first preset threshold, it indicates that there is a hazard of collision between the first vehicle and the second vehicle. Therefore, in Manner 3, to avoid a collision, the first vehicle needs to reduce the vehicle speed. When the lower limit of the first vehicle speed range is greater than the upper limit of the second vehicle speed range, there is no intersection between the first vehicle speed range to which the first driver assistance system is applied and the second vehicle speed range to which the second driver assistance system is applied, and the lower limit of the first vehicle speed range to which the first driver assistance system is applied is greater than the upper limit of the second vehicle speed range to which the second driver assistance system is applied.

For example, the first driver assistance system is the ACC system (the applied first vehicle speed range is 65 km/h to 120 km/h), and the second driver assistance system is the TJA system (the applied second vehicle speed range is 0 km/h to 60 km/h). For ease of description, in Manner 3, an example in which the first driver assistance system is the ACC system and the second driver assistance system is the TJA system is used for description.

Figure 7:
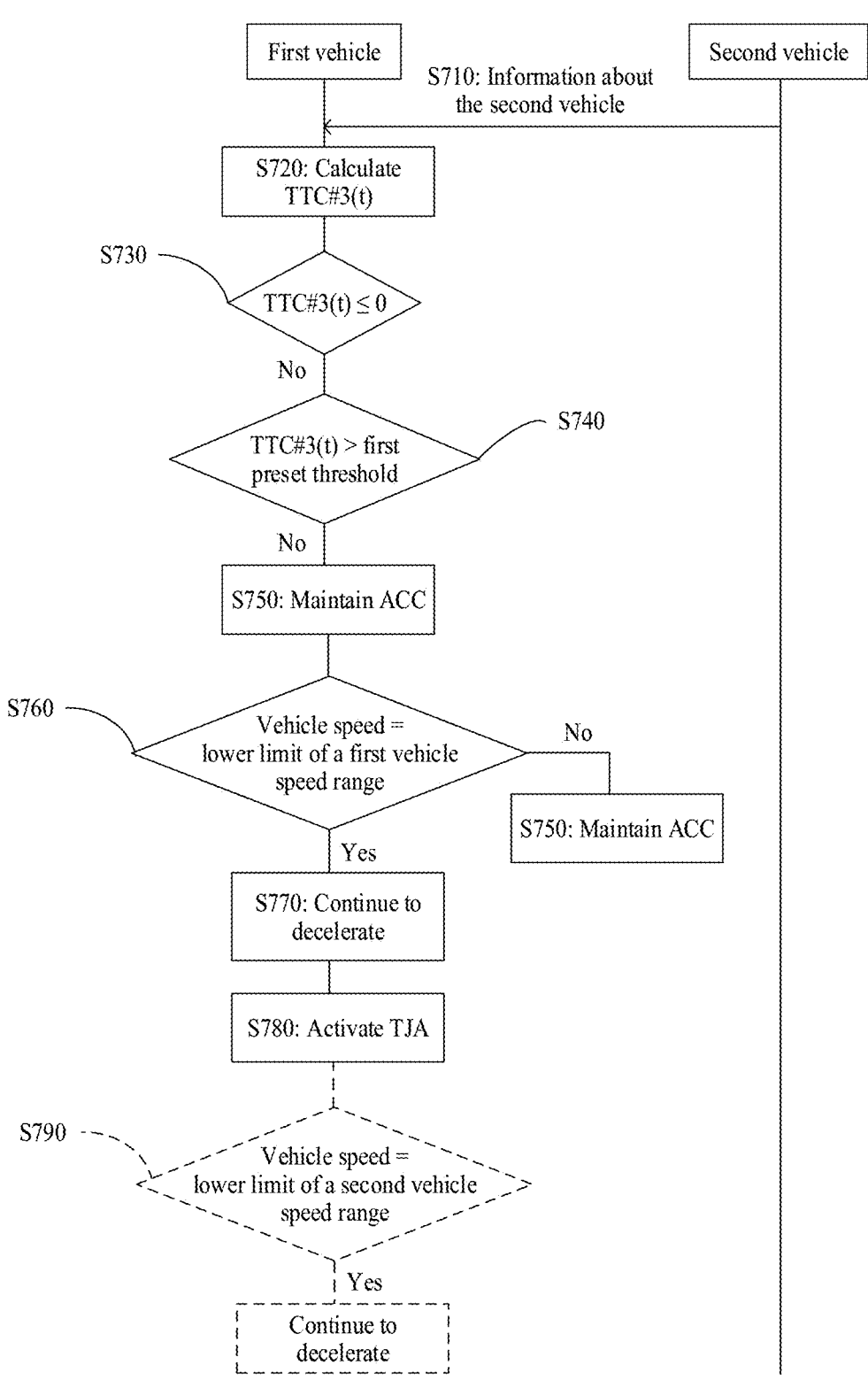
FIG. 7 is a flowchart of still another method for controlling a first vehicle according to an embodiment of the present disclosure.

FIG. 7 is still another flowchart of controlling a first vehicle according to an embodiment of this application. Specifically, in Manner 3, a specific procedure in which the first vehicle controls the first vehicle includes the following:

S710: The first vehicle obtains information about a second vehicle.

The information about the second vehicle includes vehicle speed information of the second vehicle and location information of the second vehicle.

S720: The first vehicle calculates TTC #3(t).

The first vehicle calculates a relative speed v #3(t) of the first vehicle and the second vehicle based on a vehicle speed of the second vehicle and a vehicle speed of the first vehicle, and the first vehicle calculates an inter-vehicle distance x #3(t) between the first vehicle and the second vehicle based on a location of the second vehicle and a location of the first vehicle, where TTC #3(t)=x #3(t)/v #3(t).

S730: The first vehicle determines whether the TTC #3(t) is a non-positive number.

In Manner 3, the TTC #3(t) is a positive number.

S740: The first vehicle determines whether the TTC #3(t) is greater than a first preset threshold.

In Manner 3, the TTC #3(t) is a value less than or equal to the first preset threshold.

It should be understood that S740 may be performed after S730 is performed, that is, after it is determined that the TTC #3(t) is a positive number, it is determined that the TTC #3(t) is a value less than or equal to the first preset threshold. Alternatively, S740 and S730 may be combined into one step, that is, after S720, it is directly determined whether the TTC #3(t) is a value greater than 0 and less than or equal to the first preset threshold. This is not limited in this embodiment.

When the TTC #3(t) is a positive number less than or equal to the first preset threshold, ACC controls the first vehicle to decelerate. That is, the procedure shown in FIG. 7 further includes S750: Maintain the ACC.

S760: Determine whether the vehicle speed of the first vehicle reaches a lower limit of a first vehicle speed range.

S770: When the vehicle speed of the first vehicle reaches the lower limit of the first vehicle speed range, the first vehicle determines, based on the TTC #3(t), that there is a hazard of collision, and indicates a first driver assistance system to exit a running state. The first vehicle controls, based on the TTC #3(t), the first vehicle to continue to decelerate, so that the vehicle speed of the first vehicle reaches an upper limit of a second vehicle speed range, to activate a second driver assistance system to be in a running state. That is, the procedure shown in FIG. 7 further includes S780: Activate TJA.

It should be understood that, when the first vehicle decelerates and the speed reaches the lower limit of the first vehicle speed range, the first vehicle determines, based on the TTC #3(t), that there is a hazard of collision, and the first driver assistance system exits. According to a current design of a vehicle control system, when the vehicle speed of the first vehicle reaches the lower limit of the first vehicle speed range and a driver determines that there is a hazard of collision, the driver takes over the first vehicle to decelerate.

In Manner 3, when the first driver assistance system controls the first vehicle to decelerate and the speed reaches the lower limit of the first vehicle speed range, the first vehicle determines, based on the TTC #3(t), that there is a hazard of collision, the first driver assistance system exits the running state, and a control system (for example, may be referred to as a V2X control system) in the vehicle takes over the first vehicle to continue to decelerate, so that the vehicle speed of the first vehicle reaches the upper limit of the second vehicle speed range, to activate the second driver assistance system.

Specifically, when the vehicle speed of the first vehicle reaches the upper limit of the second vehicle speed range, the second driver assistance system is activated, and the second driver assistance system takes over the first vehicle.

In the foregoing procedure, the driver does not need to take over the first vehicle. When the first vehicle determines that there is a hazard of collision with the second vehicle, the first driver assistance system controls the first vehicle to decelerate, and continues to monitor whether there is a hazard of collision with the second vehicle in a deceleration process. When the first driver assistance system controls the first vehicle to decelerate and the speed reaches the lower limit of the first vehicle speed range to which the first driver assistance system is applied, if there is still a hazard of collision between the first vehicle and the second vehicle, the first driver assistance system exits, and a control system (for example, may be referred to as a V2X control system) in the first vehicle controls the first vehicle to continue to decelerate. When the vehicle speed of the first vehicle reaches the upper limit of the second vehicle speed range, the second driver assistance system is activated, and the second driver assistance system takes over the first vehicle.

Optionally, in a process in which the control system controls the first vehicle to continue to decelerate, the first vehicle continues to monitor whether there is a hazard of collision with the second vehicle. When there is no hazard of collision between the first vehicle and the second vehicle, the control system controls the first vehicle to accelerate, so that the vehicle speed of the first vehicle reaches the lower limit of the first vehicle speed range, and the first driver assistance system is reactivated.

Further, in Manner 3, when the first vehicle speed range to which the second driver assistance system is applied does not include 0 km/h, for example, the second vehicle speed range to which the second driver assistance system is applied is 10 km/h to 60 km/h, if the vehicle speed of the first vehicle reaches 10 km/h, it is determined, based on the updated TTC #3(t), that a collision may further occur. The procedure shown in FIG. 7 further includes 5790: Determine whether the vehicle speed of the first vehicle reaches a lower limit of the second vehicle speed range. When the vehicle speed of the first vehicle reaches the lower limit of the second vehicle speed range, the first vehicle determines, based on the updated TTC #3(t), that there is a hazard of collision, and the second driver assistance system exits the running state. The first vehicle controls, based on the updated TTC #3(t), the first vehicle to continue to decelerate until the speed of the first vehicle is 0 km/h.

Manner 4:

Corresponding to the possibility 1 in S320, the first parameter is TTC(t).

When the TTC(t) is a positive number less than or equal to the first preset threshold, and an upper limit of the first vehicle speed range is less than a lower limit of the second vehicle speed range, the first vehicle controls, based on the TTC(t), the first driver assistance system to maintain a running state.

Similar to that described in Manner 1, when the TTC(t) is greater than the first preset threshold, there is no hazard of collision between the first vehicle and the second vehicle. When the TTC(t) is less than or equal to the first preset threshold, it indicates that there is a hazard of collision between the first vehicle and the second vehicle. Therefore, in Manner 4, to avoid a collision, the first vehicle needs to reduce a vehicle speed. When the upper limit of the first vehicle speed range is less than the lower limit of the second vehicle speed range, there is no intersection between the first vehicle speed range to which the first driver assistance system is applied and the second vehicle speed range to which the second driver assistance system is applied, and the upper limit of the first vehicle speed range to which the first driver assistance system is applied is greater than the lower limit of the second vehicle speed range to which the second driver assistance system is applied.

For example, the first driver assistance system is the TJA system (the applied first vehicle speed range is 0 km/h to 60 km/h), and the second driver assistance system is the ACC system (the applied second vehicle speed range is 65 km/h to 120 km/h). For ease of description, in Manner 4, an example in which the first driver assistance system is the TJA system and the second driver assistance system is the ACC system is used for description.

Figure 8:
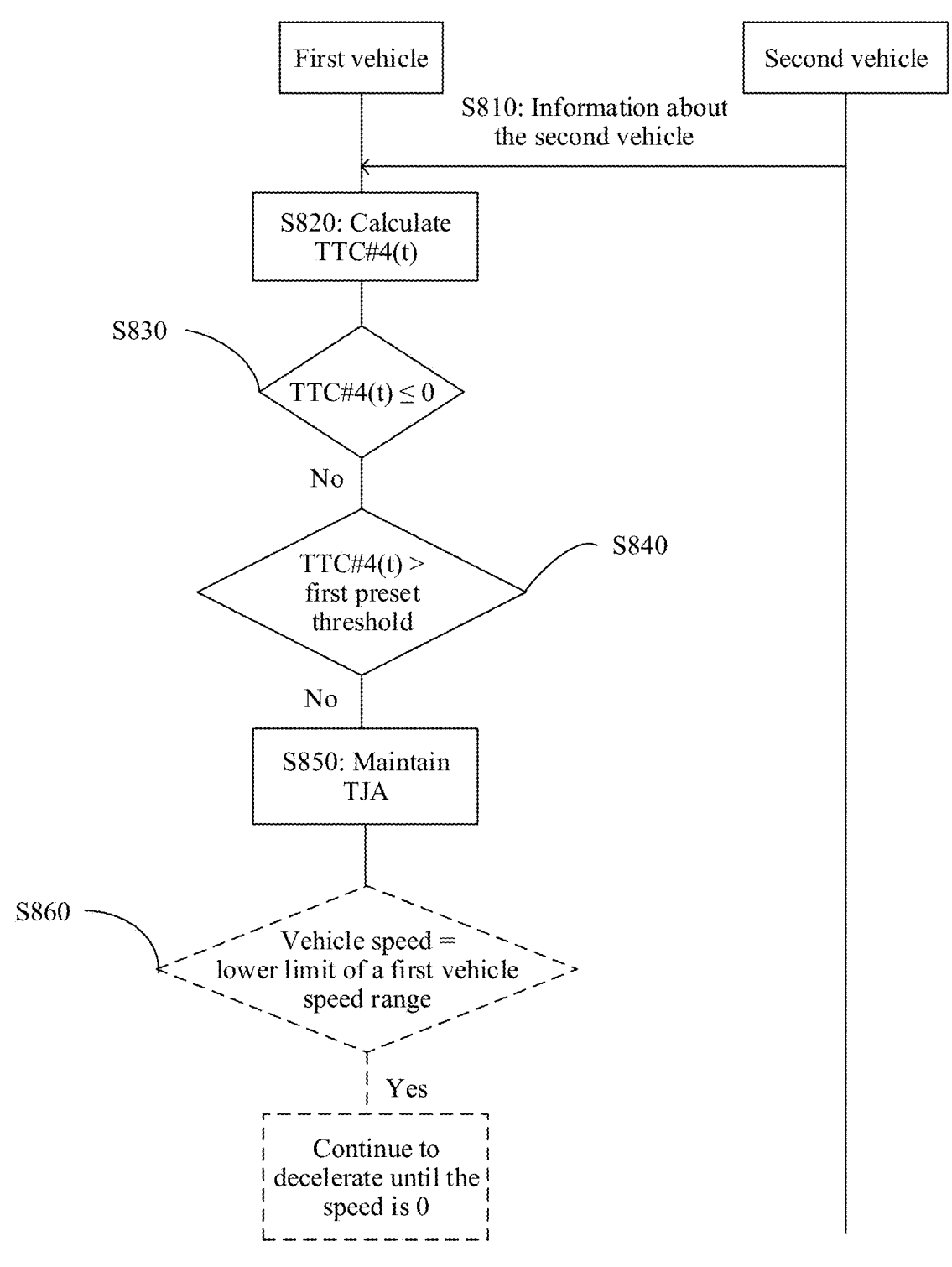
FIG. 8 is a flowchart of yet another method for controlling a first vehicle according to an embodiment of the present disclosure.

FIG. 8 is yet another flowchart of controlling a first vehicle according to an embodiment of this application. Specifically, in Manner 4, a specific procedure in which the first vehicle controls the first vehicle includes the following:

S810: The first vehicle obtains information about a second vehicle.

The information about the second vehicle includes vehicle speed information of the second vehicle and location information of the second vehicle.

S820: The first vehicle calculates TTC #4(t).

The first vehicle calculates a relative speed v #4(t) of the first vehicle and the second vehicle based on a vehicle speed of the second vehicle and a vehicle speed of the first vehicle, and the first vehicle calculates an inter-vehicle distance x #4(t) between the first vehicle and the second vehicle based on a location of the second vehicle and a location of the first vehicle, where TTC #4(t)=x #4(t)/v #4(t).

S830: The first vehicle determines whether the TTC #4(t) is a non-positive number.

In Manner 4, the TTC #4(t) is a positive number.

S840: The first vehicle determines whether the TTC #4(t) is greater than a first preset threshold.

In Manner 4, the TTC #4(t) is a value less than or equal to the first preset threshold.

It should be understood that S840 may be performed after S830 is performed, that is, after it is determined that the TTC #4(t) is a positive number, it is determined that the TTC #4(t) is a value less than or equal to the first preset threshold. Alternatively, S840 and S830 may be combined into one step, that is, after S820, it is directly determined whether the TTC #4(t) is a value greater than 0 and less than or equal to the first preset threshold. This is not limited in this embodiment.

When the TTC #4(t) is a positive number less than or equal to the first preset threshold, the first vehicle needs to decelerate. Because an upper limit of a first vehicle speed range is less than a lower limit of a second vehicle speed range, a first driver assistance system that currently controls the first vehicle controls the first vehicle to decelerate. The procedure shown in FIG. 8 further includes S850: TJA maintains an active state.

For example, the TJA controls the first vehicle to decelerate. In a running process, the first vehicle obtains updated information about the second vehicle, determines, based on the obtained updated information about the second vehicle, whether a collision is to occur, and controls the first vehicle based on a determining result. If it is continuously determined, based on updated TTC #4(t), that a collision may occur, the TJA may control the first vehicle to decelerate until the speed of the first vehicle is 0 km/h.

Further, in Manner 4, when the first vehicle speed range to which the first driver assistance system is applied does not include 0 km/h, for example, the first vehicle speed range to which the first driver assistance system is applied is 10 km/h to 60 km/h, if the vehicle speed of the first vehicle reaches 10 km/h, it is determined, based on the updated TTC #4(t), that a collision may further occur. The procedure shown in FIG. 8 further includes S860: Determine whether the vehicle speed of the first vehicle reaches a lower limit of the first vehicle speed range. When the vehicle speed of the first vehicle reaches the lower limit of the first vehicle speed range, the first vehicle determines, based on the updated TTC #4(t), that there is a hazard of collision, and the first driver assistance system exits the running state. The first vehicle controls, based on the updated TTC #4(t), the first vehicle to continue to decelerate until the speed of the first vehicle is 0 km/h.

It should be understood that the information about the second vehicle in Manner 1 to Manner 4 may include other information other than the vehicle speed information of the second vehicle and the location information of the second vehicle, for example, further include size information, vehicle model information, or the like of the second vehicle. The information about the second vehicle is not described in detail herein again.

Manner 5:

Corresponding to the possibility 2 in S320, the first parameter is TI(t).

When the TI(t) is greater than a second preset threshold, and a lower limit of a first vehicle speed range is greater than an upper limit of a second vehicle speed range, the first vehicle controls, based on the TI(t), a first driver assistance system to maintain an active state.

When the TI(t) is greater than the second preset threshold, there is no hazard of collision between the first vehicle and the second vehicle. When the lower limit of the first vehicle speed range is greater than the upper limit of the second vehicle speed range, there is no intersection between the first vehicle speed range to which the first driver assistance system is applied and the second vehicle speed range to which the second driver assistance system is applied, and the lower limit of the first vehicle speed range to which the first driver assistance system is applied is greater than the upper limit of the second vehicle speed range to which the second driver assistance system is applied.

For example, the first driver assistance system is the ACC system (the applied first vehicle speed range is 65 km/h to 120 km/h), and the second driver assistance system is the TJA system (the applied second vehicle speed range is 0 km/h to 60 km/h). For ease of description, in Manner 1, an example in which the first driver assistance system is the ACC system and the second driver assistance system is the TJA system is used for description.

Figure 9:
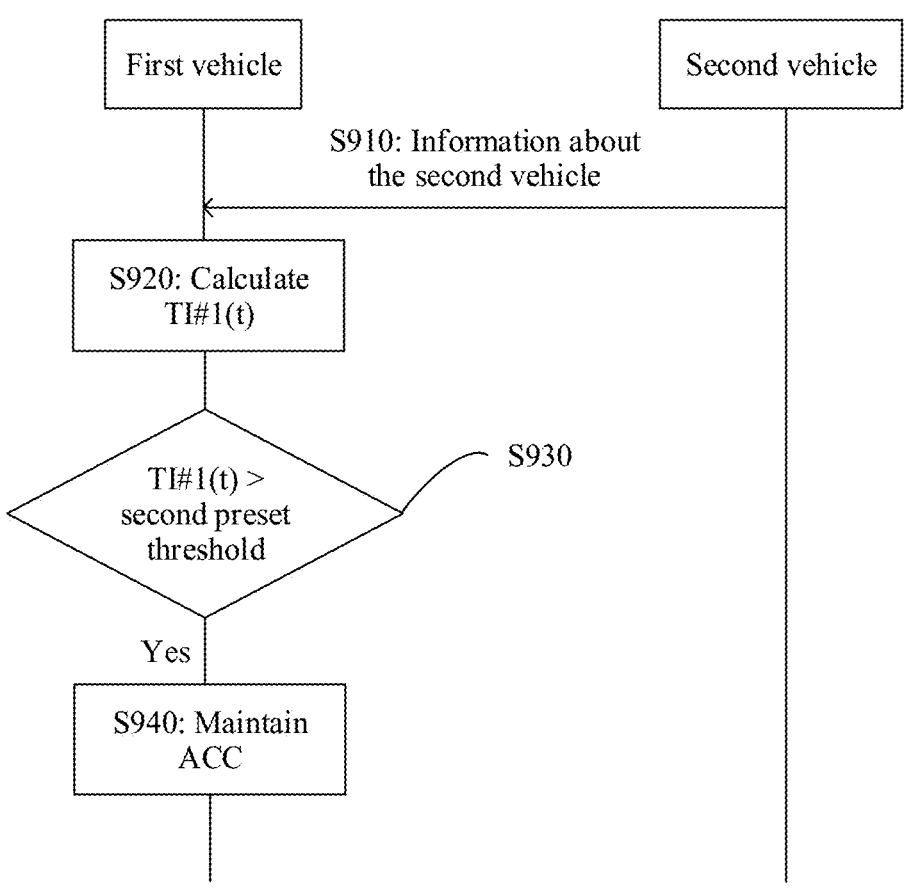
FIG. 9 is a flowchart of still yet another method for controlling a first vehicle according to an embodiment of the present disclosure.

FIG. 9 is still yet another flowchart of controlling a first vehicle according to an embodiment of this application. Specifically, in Manner 5, a specific procedure in which the first vehicle controls the first vehicle based on a first parameter includes the following:

S910: The first vehicle obtains information about a second vehicle.

The information about the second vehicle includes location information of the second vehicle.

S920: The first vehicle calculates TI #1(t).

The first vehicle calculates an inter-vehicle distance x #1(t) between the first vehicle and the second vehicle based on a location of the second vehicle and a location of the first vehicle, and a vehicle speed of the first vehicle is VS #1(t), where TI #1(t)=VS #1(t)/x #1(t).

S930: The first vehicle determines whether the TI #1(t) is greater than a second preset threshold.

In Manner 1, the TI #1(t) is a value greater than the second preset threshold.

S940: ACC maintains an active state.

In Manner 1, a moving speed of the first vehicle is maintained within a first vehicle speed range to which the ACC is applied.

For example, the first vehicle may accelerate, but a speed range is not greater than 120 km/h.

It should be understood that, in a running process, the first vehicle may obtain updated information about the second vehicle, determine, based on the obtained updated information about the second vehicle, whether a collision is to occur, and control the first vehicle based on a determining result.

Manner 6:

Corresponding to the possibility 2 in S320, the first parameter is TI(t).

When the TI(t) is greater than the second preset threshold, and an upper limit of the first vehicle speed range is less than a lower limit of the second vehicle speed range, the first driver assistance system controls the first vehicle to accelerate. When the vehicle speed exceeds the upper limit of the first vehicle speed range, the first vehicle determines, based on the TI(t), that there is no hazard of collision between the first vehicle and the second vehicle. If the first vehicle determines that a safe driving speed range of the first vehicle exceeds the first vehicle speed range, the first vehicle indicates the first driver assistance system to exit, and controls the first vehicle to continue to accelerate to run at a first vehicle speed beyond the first vehicle speed range.

In a process in which the first vehicle runs at the first vehicle speed beyond the first vehicle speed range, the first vehicle may obtain updated first information, determine an updated first parameter based on the updated first information, and then control, based on the updated first parameter (for example, the updated first parameter indicates that there is no hazard of collision between the first vehicle and the second vehicle, and the first vehicle may determine that the vehicle speed of the first vehicle is within the second vehicle speed range), the first vehicle to accelerate, so that the vehicle speed of the first vehicle reaches the lower limit of the second vehicle speed range, to activate a second driver assistance system.

Similar to the description in Manner 5, when the TI(t) is greater than the second preset threshold, there is no hazard of collision between the first vehicle and the second vehicle. When the upper limit of the first vehicle speed range is less than the lower limit of the second vehicle speed range, there is no intersection between the first vehicle speed range to which the first driver assistance system is applied and the second vehicle speed range to which the second driver assistance system is applied, and the upper limit of the first vehicle speed range to which the first driver assistance system is applied is greater than the lower limit of the second vehicle speed range to which the second driver assistance system is applied.

For example, the first driver assistance system is the TJA system (the applied first vehicle speed range is 0 km/h to 60 km/h), and the second driver assistance system is the ACC system (the applied second vehicle speed range is 65 km/h to 120 km/h). For ease of description, in Manner 6, an example in which the first driver assistance system is the TJA system and the second driver assistance system is the ACC system is used for description.

Figure 10:
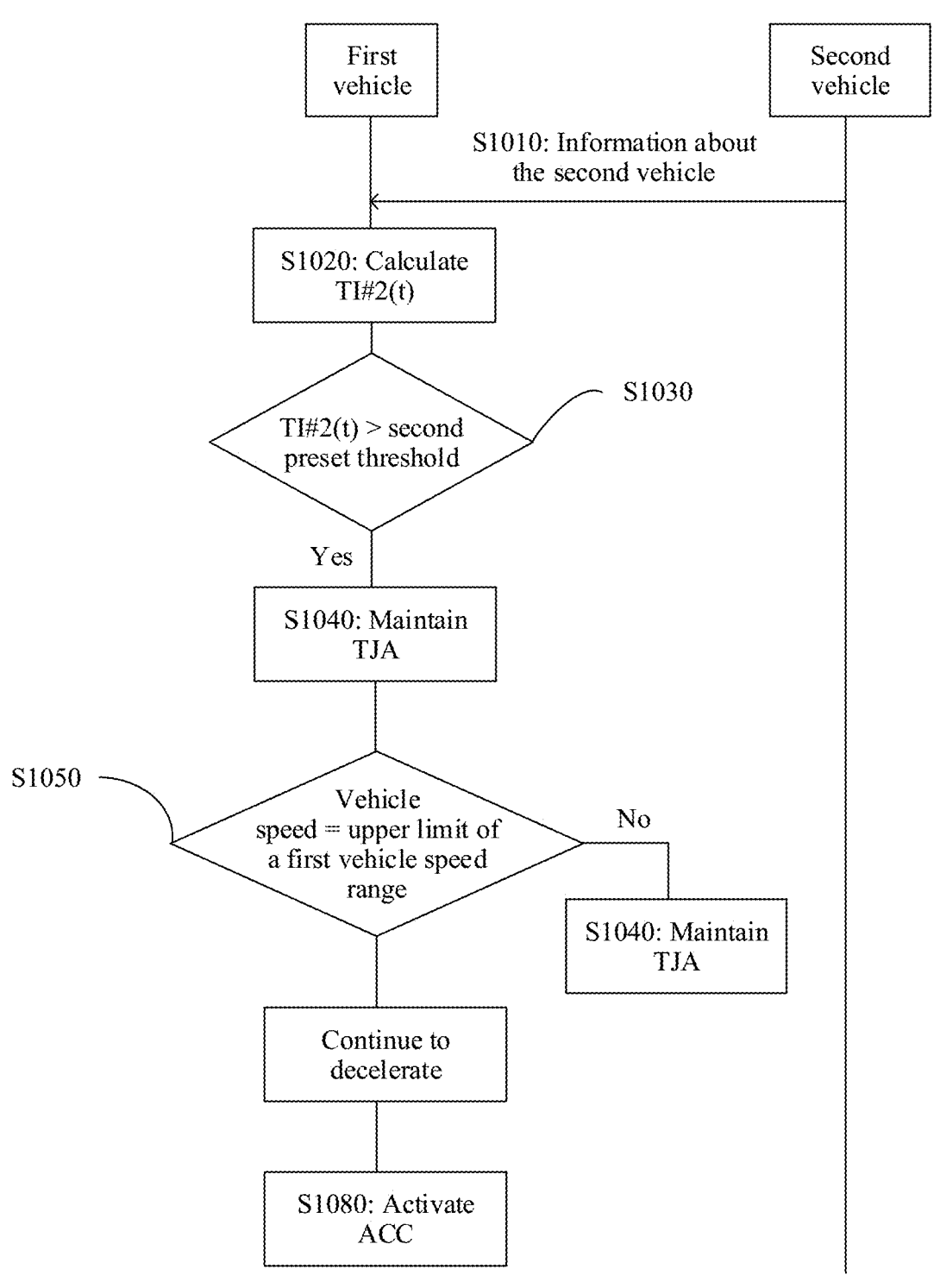
FIG. 10 is a flowchart of a further method for controlling a first vehicle according to an embodiment of the present disclosure.

FIG. 10 is a further flowchart of controlling a first vehicle according to an embodiment of this application. Specifically, in Manner 6, a specific procedure in which the first vehicle controls the first vehicle includes the following:

S1010: The first vehicle obtains information about a second vehicle.

The information about the second vehicle includes location information of the second vehicle.

S1020: The first vehicle calculates TI #2(t).

The first vehicle calculates an inter-vehicle distance x #2(t) between the first vehicle and the second vehicle based on a location of the second vehicle and a location of the first vehicle, and a vehicle speed of the first vehicle is VS #2(t), where TI #2(t)=VS #2(t)/x #2(t).

S1030: The first vehicle determines whether the TI #1(t) is greater than a second preset threshold.

In Manner 6, the TI #2(t) is a value greater than the second preset threshold.

When the TI #2(t) is greater than the second preset threshold, TJA controls the first vehicle to accelerate. That is, the procedure shown in FIG. 10 further includes S1040: Maintain the TJA.

S1050: Determine whether the vehicle speed of the first vehicle reaches an upper limit of a first vehicle speed range.

S1060: When the vehicle speed of the first vehicle reaches the upper limit of the first vehicle speed range, the first vehicle determines, based on the TI #2(t), that there is no hazard of collision, and indicates a first driver assistance system to exit a running state. The first vehicle controls, based on the TI #2(t), the first vehicle to continue to accelerate, so that the vehicle speed of the first vehicle reaches a lower limit of a second vehicle speed range, to activate a second driver assistance system. That is, the procedure shown in FIG. 10 further includes S1070: Activate ACC.

It should be understood that, when the first vehicle accelerates and the speed reaches the upper limit of the first vehicle speed range, the first vehicle determines, based on the TI #2(t), that there is still no hazard of collision, and the first driver assistance system exits. According to a current design of a vehicle control system, when the vehicle speed of the first vehicle reaches the upper limit of the first vehicle speed range and a driver determines that there is no hazard of collision, the driver takes over the first vehicle to accelerate.

In Manner 6, when the first driver assistance system controls the first vehicle to accelerate and the speed reaches the upper limit of the first vehicle speed range, the first vehicle determines, based on the TI #2(t), that there is still no hazard of collision, the first driver assistance system exits the running state, and a control system (for example, may be referred to as a V2X control system) in the vehicle takes over the first vehicle to continue to accelerate, so that the vehicle speed of the first vehicle reaches the lower limit of the second vehicle speed range, to activate the second driver assistance system.

Specifically, when the vehicle speed of the first vehicle reaches the lower limit of the second vehicle speed range, the second driver assistance system is activated, and the second driver assistance system takes over the first vehicle.

In the foregoing procedure, the driver does not need to take over the first vehicle. When the first vehicle determines that there is no hazard of collision, the first driver assistance system controls the first vehicle to accelerate, and continues to monitor whether there is a hazard of collision with the second vehicle in an acceleration process. When the first driver assistance system controls the first vehicle to accelerate and the speed reaches the upper limit of the first vehicle speed range to which the first driver assistance system is applied, if there is still no hazard of collision between the first vehicle and the second vehicle, the first driver assistance system exits, and a control system (for example, may be referred to as a V2X control system) in the first vehicle controls the first vehicle to continue to accelerate. When the vehicle speed of the first vehicle reaches the lower limit of the second vehicle speed range, the second driver assistance system is activated, and the second driver assistance system takes over the first vehicle.

Manner 7:

Corresponding to the possibility 2 in S320, the first parameter is TI(t).

When the TI(t) is less than or equal to the second preset threshold, and a lower limit of the first vehicle speed range is greater than an upper limit of the second vehicle speed range, the first driver assistance system controls the first vehicle to decelerate. When the vehicle speed reaches the lower limit of the first vehicle speed range, the first vehicle determines, based on the TI(t), that there is a hazard of collision between the first vehicle and the second vehicle. If the first vehicle determines that the safe driving speed range of the first vehicle is less than the first vehicle speed range, the first vehicle indicates the first driver assistance system to exit, and controls the first vehicle to continue to decelerate to run at a first vehicle speed lower than the first vehicle speed range.

In a process in which the first vehicle runs at the first vehicle speed lower than the first vehicle speed range, the first vehicle may obtain updated first information, determine an updated first parameter based on the updated first information, and then control, based on the updated first parameter (for example, the updated first parameter indicates that there is no hazard of collision between the first vehicle and the second vehicle, and the first vehicle may determine that the vehicle speed of the first vehicle is within the second vehicle speed range), the first vehicle to continue to decelerate, so that the vehicle speed of the first vehicle reaches the lower limit of the second vehicle speed range, to activate a second driver assistance system.

Similar to that described in Manner 5, when the TI(t) is greater than the second preset threshold, there is no hazard of collision between the first vehicle and the second vehicle. When the TI(t) is less than or equal to the second preset threshold, it indicates that there is a hazard of collision between the first vehicle and the second vehicle. Therefore, in Manner 7, to avoid a collision, the first vehicle needs to reduce a vehicle speed. When the lower limit of the first vehicle speed range is greater than the upper limit of the second vehicle speed range, there is no intersection between the first vehicle speed range to which the first driver assistance system is applied and the second vehicle speed range to which the second driver assistance system is applied, and the lower limit of the first vehicle speed range to which the first driver assistance system is applied is greater than the upper limit of the second vehicle speed range to which the second driver assistance system is applied.

For example, the first driver assistance system is the ACC system (the applied first vehicle speed range is 65 km/h to 120 km/h), and the second driver assistance system is the TJA system (the applied second vehicle speed range is 0 km/h to 60 km/h). For ease of description, in Manner 7, an example in which the first driver assistance system is the ACC system and the second driver assistance system is the TJA system is used for description.

Figure 11:
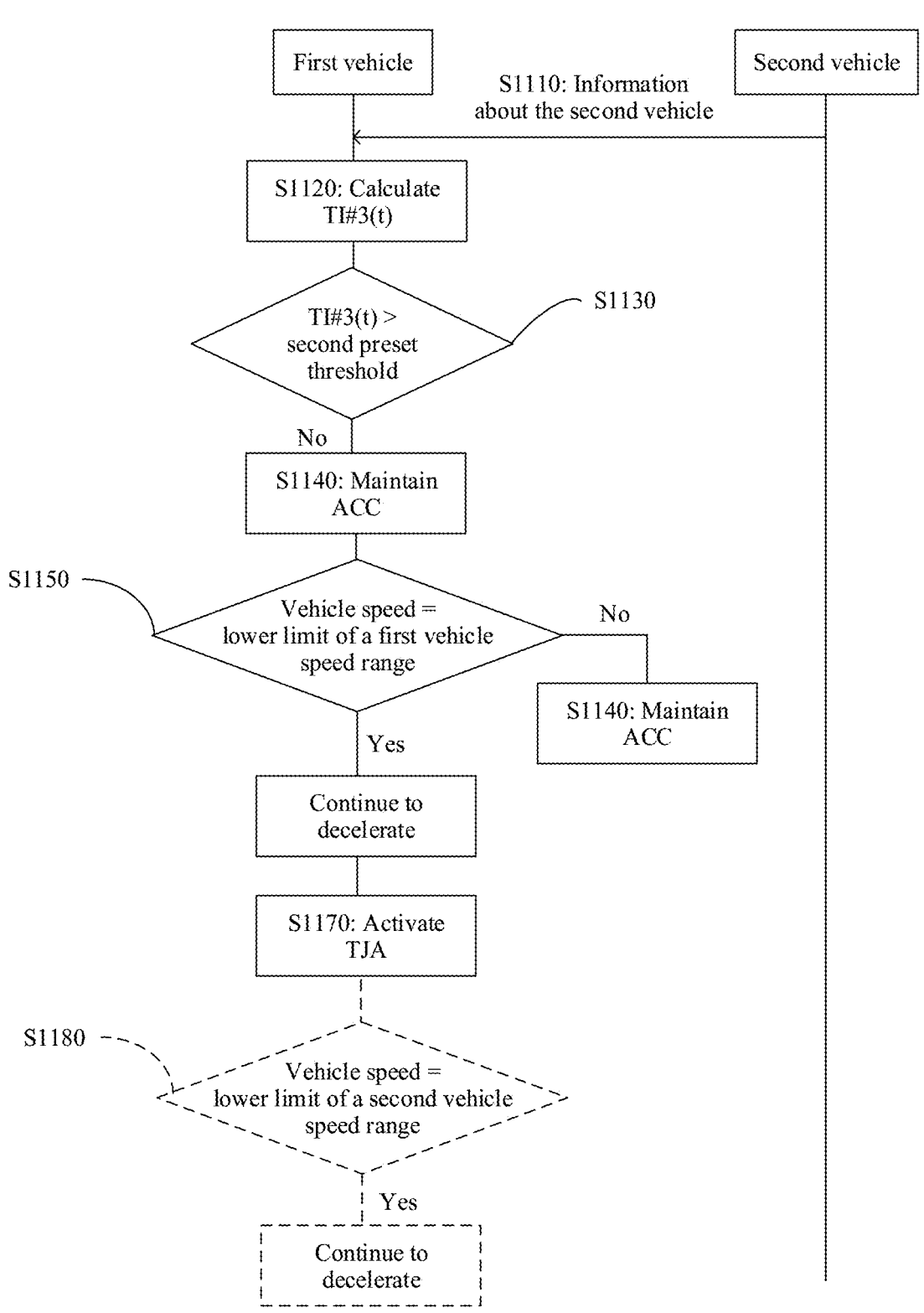
FIG. 11 is a flowchart of a still further method for controlling a first vehicle according to an embodiment of the present disclosure.

FIG. 11 is a still further flowchart of controlling a first vehicle according to an embodiment of this application. Specifically, in Manner 7, a specific procedure in which the first vehicle controls the first vehicle includes the following:

S1110: The first vehicle obtains information about a second vehicle.

The information about the second vehicle includes location information of the second vehicle.

S1120: The first vehicle calculates TI #3(t).

The first vehicle calculates an inter-vehicle distance x #3(t) between the first vehicle and the second vehicle based on a location of the second vehicle and a location of the first vehicle, and a vehicle speed of the first vehicle is VS #3(t), where TI #3(t)=VS #3(t)/x #3(t).

S1130: The first vehicle determines whether the TI #3(t) is greater than a second preset threshold.

In Manner 7, the TI #3(t) is a value less than or equal to the second preset threshold.

When the TI #3(t) is a positive number less than or equal to the second preset threshold, ACC controls the first vehicle to decelerate. That is, the procedure shown in FIG. 11 further includes S1140: Maintain the ACC.

S1150: Determine whether the vehicle speed of the first vehicle reaches a lower limit of a first vehicle speed range.

S1160: When the vehicle speed of the first vehicle reaches the lower limit of the first vehicle speed range, the first vehicle determines, based on the TI #3(t), that there is a hazard of collision, and indicates a first driver assistance system to exit a running state. The first vehicle controls, based on the TI #3(t), the first vehicle to continue to decelerate, so that the vehicle speed of the first vehicle reaches an upper limit of a second vehicle speed range, to activate a second driver assistance system. That is, the procedure shown in FIG. 11 further includes S1170: Activate TJA.

It should be understood that, when the first vehicle decelerates and the speed reaches the lower limit of the first vehicle speed range, the first vehicle determines, based on the TI #3(t), that there is a hazard of collision, and the first driver assistance system exits. According to a current design of a vehicle control system, when the vehicle speed of the first vehicle reaches the lower limit of the first vehicle speed range and a driver determines that there is a hazard of collision, the driver takes over the first vehicle to decelerate.

In Manner 7, when the first driver assistance system controls the first vehicle to decelerate and the speed reaches the lower limit of the first vehicle speed range, the first vehicle determines, based on the TI #3(t), that there is a hazard of collision, the first driver assistance system exits the running state, and a control system (for example, may be referred to as a V2X control system) in the vehicle takes over the first vehicle to continue to decelerate, so that the vehicle speed of the first vehicle reaches the upper limit of the second vehicle speed range, to activate the second driver assistance system.

Specifically, when the vehicle speed of the first vehicle reaches the upper limit of the second vehicle speed range, the second driver assistance system is activated, and the second driver assistance system takes over the first vehicle.

In the foregoing procedure, the driver does not need to take over the first vehicle. When the first vehicle determines that there is a hazard of collision with the second vehicle, the first driver assistance system controls the first vehicle to decelerate, and continues to monitor whether there is a hazard of collision with the second vehicle in a deceleration process. When the first driver assistance system controls the first vehicle to decelerate and the speed reaches the lower limit of the first vehicle speed range to which the first driver assistance system is applied, if there is still a hazard of collision between the first vehicle and the second vehicle, the first driver assistance system exits, and a control system (for example, may be referred to as a V2X control system) in the first vehicle controls the first vehicle to continue to decelerate. When the vehicle speed of the first vehicle reaches the upper limit of the second vehicle speed range, the second driver assistance system is activated, and the second driver assistance system takes over the first vehicle.

Further, in Manner 7, when the first vehicle speed range to which the second driver assistance system is applied does not include 0 km/h, for example, the second vehicle speed range to which the second driver assistance system is applied is 10 km/h to 60 km/h, if the vehicle speed of the first vehicle reaches 10 km/h, it is determined, based on the updated TI #3(t), that a collision may further occur. The procedure shown in FIG. 11 further includes S1180: Determine whether the vehicle speed of the first vehicle reaches a lower limit of the second vehicle speed range. When the vehicle speed of the first vehicle reaches the lower limit of the second vehicle speed range, the first vehicle determines, based on the updated TI #3(t), that there is a hazard of collision, and the second driver assistance system exits the running state. The first vehicle controls, based on the updated TTC, the first vehicle to continue to decelerate until the speed of the first vehicle is 0 km/h.

Manner 8:

Corresponding to the possibility 2 in S320, the first parameter is TI(t).

When the TI(t) is less than or equal to the second preset threshold, and an upper limit of the first vehicle speed range is less than a lower limit of the second vehicle speed range, the first vehicle controls, based on the TI(t), the first driver assistance system to maintain a running state.

Similar to that described in Manner 5, when the TI(t) is greater than the second preset threshold, there is no hazard of collision between the first vehicle and the second vehicle. When the TI(t) is less than or equal to the second preset threshold, it indicates that there is a hazard of collision between the first vehicle and the second vehicle. Therefore, in Manner 10, to avoid a collision, the first vehicle needs to reduce a vehicle speed. When the upper limit of the first vehicle speed range is less than the lower limit of the second vehicle speed range, there is no intersection between the first vehicle speed range to which the first driver assistance system is applied and the second vehicle speed range to which the second driver assistance system is applied, and the upper limit of the first vehicle speed range to which the first driver assistance system is applied is greater than the lower limit of the second vehicle speed range to which the second driver assistance system is applied.

For example, the first driver assistance system is the TJA system (the applied first vehicle speed range is 0 km/h to 60 km/h), and the second driver assistance system is the ACC system (the applied second vehicle speed range is 65 km/h to 120 km/h). For ease of description, in Manner 8, an example in which the first driver assistance system is the TJA system and the second driver assistance system is the ACC system is used for description.

Figure 12:
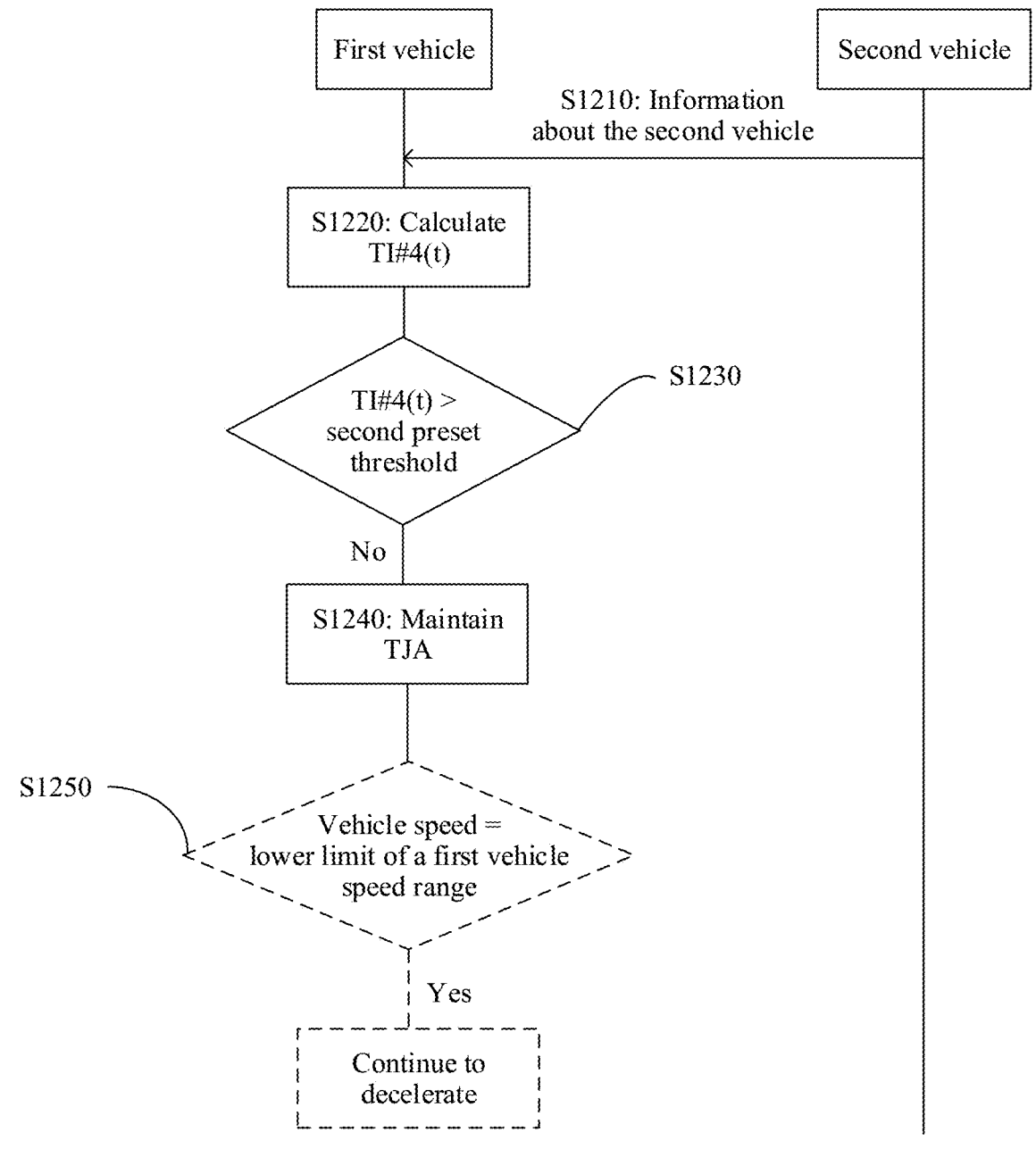
FIG. 12 is a flowchart of a yet further method for controlling a first vehicle according to an embodiment of the present disclosure.

FIG. 12 is a yet further flowchart of controlling a first vehicle according to an embodiment of this application. Specifically, in Manner 8, a specific procedure in which the first vehicle controls the first vehicle includes the following:

S1210: The first vehicle obtains information about a second vehicle.

The information about the second vehicle includes location information of the second vehicle.

S1220: The first vehicle calculates TI #4(t).

The first vehicle calculates an inter-vehicle distance x #4(t) between the first vehicle and the second vehicle based on a location of the second vehicle and a location of the first vehicle, and a vehicle speed of the first vehicle is VS #4(t), where TI #4(t)=VS #4(t)/x #4(t).

S1230: The first vehicle determines whether the TI #4(t) is greater than a second preset threshold.

In Manner 8, the TI #4(t) is a value less than or equal to the second preset threshold.

When the TI #4(t) is a positive number less than or equal to the second preset threshold, the first vehicle needs to decelerate. Because an upper limit of a first vehicle speed range is less than a lower limit of a second vehicle speed range, a first driver assistance system that currently controls the first vehicle controls the first vehicle to decelerate. The procedure shown in FIG. 12 further includes S1240: TJA maintains an active state.

For example, the TJA controls the first vehicle to decelerate. In a running process, the first vehicle obtains updated information about the second vehicle, determines, based on the obtained updated information about the second vehicle, whether a collision is to occur, and controls the first vehicle based on a determining result. If it is continuously determined, based on the determining result, that a collision may occur, the TJA may control the first vehicle to decelerate until the speed of the first vehicle is 0 km/h.

Further, in Manner 8, when the first vehicle speed range to which the first driver assistance system is applied does not include 0 km/h, for example, the first vehicle speed range to which the first driver assistance system is applied is 10 km/h to 60 km/h, if the vehicle speed of the first vehicle reaches 10 km/h, it is determined, based on the TI #4(t), that a collision may further occur. The procedure shown in FIG. 12 further includes S1250: Determine whether the vehicle speed of the first vehicle reaches a lower limit of the first vehicle speed range. When the vehicle speed of the first vehicle reaches the lower limit of the first vehicle speed range, the first vehicle determines, based on the TI #4(t), that there is a hazard of collision, and the first driver assistance system exits the running state. The first vehicle controls, based on the TI #4(t), the first vehicle to continue to decelerate until the speed of the first vehicle is 0 km/h.

It should be understood that the information about the second vehicle in Manner 5 to Manner 8 may include other information other than the location information of the second vehicle, for example, further include vehicle speed information of the second vehicle and/or size information of the second vehicle. The information about the second vehicle is not described in detail herein again.

It should be further understood that, when the information about the second vehicle includes the vehicle speed information of the second vehicle and the location information of the second vehicle in Manner 1 to Manner 4, the TI may also be calculated in Manner 1 to Manner 4, and the controlling the first vehicle based on the TI(t) is similar to that in Manner 5 to Manner 8. Details are not described herein again.

In a possible implementation, in this application, the first vehicle may further control turning of the first vehicle based on the first parameter. For example, when determining that the first parameter is obtained and determining that there is a hazard of collision between the first vehicle and the second vehicle, the first vehicle may change a traveling lane of the first vehicle by controlling the turning of the first vehicle, to avoid a collision. The present disclosure mainly relates to how to improve continuity of switching between different driver assistance systems and how to improve autonomous driving performance. Details about how to avoid a collision are not described herein.

In a possible implementation, when the second vehicle is a vehicle behind the first vehicle, different from Manner 1 to Manner 8 shown in FIG. 3B, a manner in which the first vehicle controls the first vehicle based on the first parameter is as follows: When the first vehicle obtains the first parameter through calculation and determines that there is a hazard of collision between the first vehicle and the second vehicle, the first vehicle may accelerate to avoid the hazard.

Sequence numbers of the foregoing processes do not mean execution sequences in the foregoing method embodiments. The execution sequences of the processes should be determined based on functions and internal logic of the processes, and should not constitute any limitation on the implementation processes in embodiments of this application. In addition, it is possible that not all operations in the foregoing method embodiment need to be performed.

It should be understood that the first vehicle in the foregoing method embodiments may perform a part or all of the steps in the embodiments. These steps or operations are merely examples. Embodiments of the present disclosure may further include performing other operations or variations of various operations.

It should be further understood that, in embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

The foregoing describes in detail the vehicle control method provided in embodiments of the present disclosure with reference to FIG. 3A and FIG. 3B to FIG. 12. The following describes in detail vehicle control apparatuses provided in embodiments of the present disclosure with reference to FIG. 13 to FIG. 15.

Figure 13:
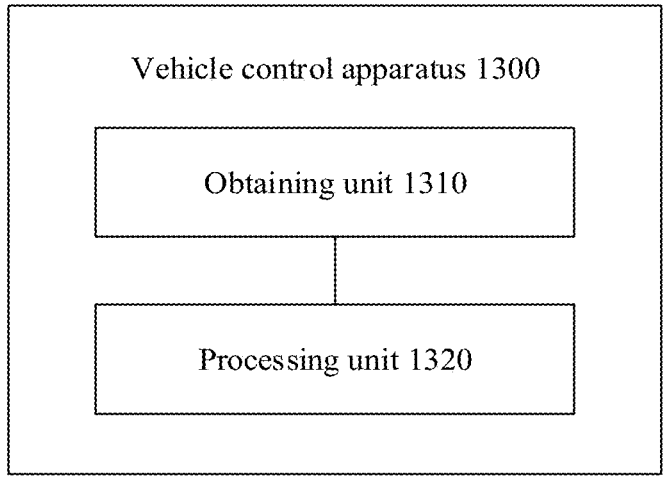
FIG. 13 is a structural block diagram of a vehicle control apparatus according to the present disclosure.

FIG. 13 is a structural block diagram of a vehicle control apparatus 1300 according to this application. As shown in FIG. 13, the apparatus 1300 includes an obtaining unit 1310 and a processing unit 1320.

The obtaining unit 1310 is configured to obtain first information of a moving object near a first vehicle.

The processing unit 1320 is configured to determine a first parameter based on the first information.

The processing unit 1320 is further configured to: terminate, based on the first parameter, an active state of a driver assistance system that is currently in an active state and that is in at least one driver assistance system; and set, based on the first parameter, the first vehicle to run at a first vehicle speed beyond at least one vehicle speed range.

For example, the obtaining unit 1310 is further configured to obtain updated first information.

The processing unit 1320 is further configured to update the first parameter based on the updated first information.

The processing unit 1320 is further configured to set, based on an updated first parameter, the first vehicle to run at a second vehicle speed within the at least one vehicle speed range.

The processing unit 1320 is further configured to activate one of the at least one driver assistance system based on the updated first parameter.

For example, the obtaining unit 1310 includes a receiving unit or a measurement unit.

That the obtaining unit 1310 obtains first information of a moving object near a first vehicle includes the following:

The receiving unit is configured to receive the first information from the moving object; or the measurement unit is configured to obtain the first information of the moving object through measurement.

For example, that the processing unit 1320 terminates, based on the first parameter, an active state of a driver assistance system that is currently in an active state and that is in at least one driver assistance system includes the following:

The processing unit 1320 determines that a safe driving speed range does not intersect with a vehicle speed range corresponding to the active state of the driver assistance system in the active state.

The processing unit 1320 terminates the active state of the driver assistance system in the active state.

For example, that the processing unit 1320 sets, based on the first parameter, the first vehicle to run at a first vehicle speed beyond at least one vehicle speed range includes: The processing unit 1320 sets the first vehicle to run at a first vehicle speed within the safe driving speed range.

For example, the first parameter includes the safe driving speed range that the first vehicle is supposed to have when there is no hazard of collision between the first vehicle and the moving object. That the processing unit 1320 sets, based on an updated first parameter, the first vehicle to run at a second vehicle speed within the at least one vehicle speed range includes the following:

The processing unit 1320 determines that there is an intersection between the safe driving speed range and the at least one vehicle speed range.

The processing unit 1320 sets the second vehicle speed to be within the intersection between the safe driving speed range and the at least one vehicle speed range.

For example, that the processing unit 1320 activates one of the at least one driver assistance system based on the updated first parameter includes the following:

The processing unit 1320 activates one of the at least one driver assistance system. A vehicle speed range corresponding to an active state of the one driver assistance system includes the second vehicle speed.

For example, that the first vehicle is configured with at least one driver assistance system, and an active state of the at least one driver assistance system is corresponding to at least one vehicle speed range includes: The first vehicle is configured with a first driver assistance system and a second driver assistance system, an active state of the first driver assistance system is corresponding to a first vehicle speed range, an active state of the second driver assistance system is corresponding to a second vehicle speed range, and the first vehicle speed range and the second vehicle speed range have no intersection.

That the processing unit 1320 terminates, based on the first parameter, an active state of a driver assistance system that is currently in an active state and that is in at least one driver assistance system includes the following:

The processing unit 1320 terminates, based on the first parameter, the active state of the first driver assistance system that is currently in the active state.

That the processing unit 1320 activates one of the at least one driver assistance system based on the updated first parameter includes the following:

The processing unit 1320 activates the first driver assistance system or the second driver assistance system based on the updated first parameter.

The apparatus 1300 is corresponding to an execution body of the method embodiments shown in FIG. 3A and FIG. 3B to FIG. 12. The apparatus 1300 may be the first vehicle in the method embodiments, or a chip, a circuit, a component, a system, or a functional module in the first vehicle in the method embodiments may be another device (for example, a road side unit RSU or an application server) in the vehicle-to-everything. Corresponding units of the apparatus 1300 are configured to perform corresponding steps in the method embodiments shown in FIG. 3A and FIG. 3B to FIG. 12.

The obtaining unit 1310 in the apparatus 1300 is configured to perform corresponding obtaining-related steps of the first vehicle in the method embodiments, for example, perform step S310*a* of obtaining first information in FIG. 3A, perform step S350*a* of obtaining updated first information in FIG. 3A, perform step S310*b* of obtaining first information in FIG. 3B, perform step S350*b* of obtaining updated first information in FIG. 3B, and perform steps of obtaining information about a second vehicle in FIG. 5 to FIG. 12.

The processing unit 1320 in the apparatus 1300 is configured to perform corresponding processing-related steps of the first vehicle in the method embodiments, for example, perform step S320*a* of determining the first parameter in FIG. 3A, perform step S330*a* of terminating the first driver assistance system in FIG. 3A, perform step S330*a* of setting the first vehicle to run at the first vehicle speed in FIG. 3A, perform step S360*a* of determining the updated first parameter in FIG. 3A, perform step S370*a* of setting the first vehicle to run at the second vehicle speed in FIG. 3A, perform step S380*a* of reactivating the first driver assistance system in FIG. 3A, perform step S320*b* of determining the first parameter in FIG. 3B, perform step S330*b* of terminating the first driver assistance system in FIG. 3B, perform step S330*b* of setting the first vehicle to run at the first vehicle speed in FIG. 3B, perform step S360*b* of determining the updated first parameter in FIG. 3B, perform step S370*b* of setting the first vehicle to run at the second vehicle speed in FIG. 3B, perform step S380*b* of activating the second driver assistance system in FIG. 3B, perform steps of calculating the TTC in FIG. 4 to FIG. 8, perform steps of determining a value relationship between the TTC and 0 and a value relationship between the TTC and a first threshold in FIG. 4 to FIG. 8, perform step S330*a* of reactivating the first driver assistance system in FIG. 3A, perform step S330*b* of controlling the first vehicle in FIG. 3B, and perform steps of controlling the first vehicle in FIG. 4 to FIG. 8.

Only one or more of the units in FIG. 13 may be implemented by software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC). The foregoing units may exist independently, or may be all or partially integrated.

Figure 14:
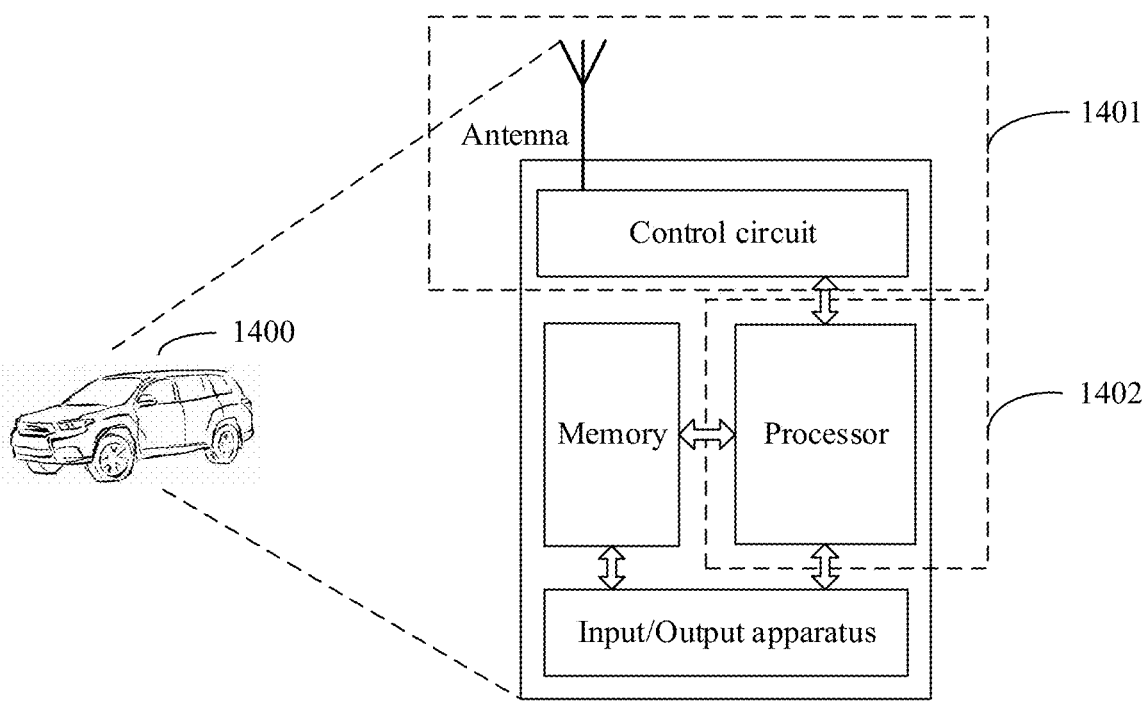
FIG. 14 is a structural block diagram of a first vehicle applicable to an embodiment of the present disclosure.

FIG. 14 is a structural block diagram of a first vehicle 1400 applicable to an embodiment of this application. The first vehicle 1400 may be applied to the system shown in FIG. 1. For ease of description, FIG. 14 shows only main components of the first vehicle. As shown in FIG. 14, the first vehicle 1400 includes a processor, a memory, a control circuit, an antenna, and an input/output apparatus.

The memory stores computer program instructions. The processor runs the computer program instructions to perform the vehicle control method described in the method embodiments shown in FIG. 3A and FIG. 3B to FIG. 12. The antenna and the input/output apparatus may be configured to obtain the first information. The control circuit may be configured to control a vehicle power apparatus, so that the vehicle runs at a speed set by the processor.

A person skilled in the art may understand that for ease of description, FIG. 14 shows only one memory and only one processor. Actually, the first vehicle may include a plurality of processors and memories. The memory may also be referred to as a storage medium, a storage device, or the like. This is not limited in embodiments of this application.

Figure 15:
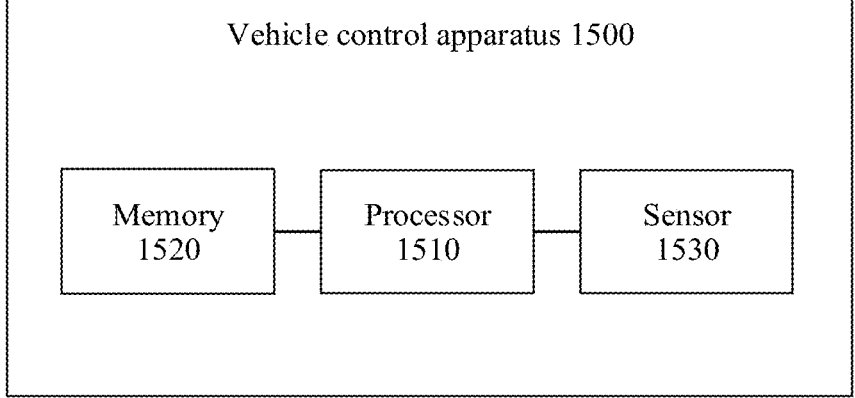
FIG. 15 is a structural block diagram of a first vehicle applicable to an embodiment of this application.

FIG. 15 is a schematic diagram of a structure of a first vehicle 1500 applicable to an embodiment of this application. The first vehicle 1500 may be applied to the system shown in FIG. 1. For ease of description, FIG. 15 shows only main components of the first vehicle. As shown in FIG. 15, the first vehicle 1500 includes a processor 1510, a memory 1520, and a sensor 1530.

The memory 1520 stores computer program instructions. The processor 1510 runs the computer program instructions to perform the vehicle control method described in the method embodiments shown in FIG. 3A and FIG. 3B to FIG. 12. The sensor 1530 may be configured to obtain the first information. The present disclosure further provides a computer-readable storage medium. The computer-readable storage medium stores instructions. When the instructions are run on a computer, the vehicle control apparatus is enabled to perform the steps in the methods shown in FIG. 3A and FIG. 3B to FIG. 12.

The present disclosure further provides a computer program product including instructions. When the computer program product runs on a computer, the vehicle control apparatus is enabled to perform the steps in the methods shown in FIG. 3A and FIG. 3B to FIG. 12.

The present disclosure further provides a chip, including a processor. The processor is configured to: read and run a computer program stored in a memory, to perform the corresponding operation and/or procedure performed by the first vehicle in the vehicle control method provided in this application. Optionally, the chip further includes a memory. The memory and the processor are connected to the memory by using a circuit or a wire. The processor is configured to read and execute the computer program in the memory. Further, optionally, the chip includes a communication interface. The processor is connected to the communication interface. The communication interface is configured to receive data and/or information that need/needs to be processed. The processor obtains the data and/or information from the communication interface, and processes the data and/or information. The communication interface may be an input/output interface, an interface circuit, an output circuit, an input circuit, a pin, a related circuit, or the like in the chip. The processor may alternatively be embodied as a processing circuit or a logic circuit.

The foregoing chip may alternatively be replaced with a chip system. Details are not described herein again. The processor includes but is not limited to various CPUs, a DSP, a microcontroller, a microprocessor, or an artificial intelligence processor.

In this application, the terms "include", "have", and any other variants mean to cover the non-exclusive inclusion, for example, a process, method, system, product, or device that includes a list of steps or units is not necessarily limited to those steps or units that are clearly listed, but may include other steps or units not expressly listed or inherent to such a process, method, product, or device.

In addition, the term "and/or" in the present disclosure describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects. The term "at least one" in the present disclosure may represent "one" and "two or more". For example, at least one of A, B, and C may indicate the following seven cases: Only A exists, only B exists, only C exists, both A and B exist, both A and C exist, both C and B exist, and A, B, and C exist.

A person skilled in the art may clearly understand that, descriptions of embodiments provided in the present disclosure may be mutually referenced. For ease and brevity of description, for example, for functions of the apparatuses and devices and performed steps that are provided in embodiments of this application, refer to related descriptions in method embodiments of this application. Reference can also be made between various method embodiments and between various apparatus embodiments.

A person skilled in the art may understand that all or some of the steps of the method embodiments may be implemented by a program instructing related hardware. The program may be stored in a computer-readable storage medium. When the program is executed, some or all of the steps of the method embodiments are performed. The foregoing storage medium includes various media that can store program code, such as a read-only memory (ROM), a random-access memory (RAM), a magnetic disk, or an optical disc.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present disclosure are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a Digital Video Disc (DVD)), a semiconductor medium (for example, a solid state-disk (SSD)), or the like.

In the several embodiments provided in this application, it should be understood that the disclosed system, apparatus, and method may be implemented in other manners without departing from the scope of this application. For example, the described embodiment is merely an example. For example, division into the modules or units is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected based on actual requirements to achieve the objectives of the solutions of embodiments. A person of ordinary skill in the art may understand and implement embodiments without creative efforts.

In addition, the schematic diagrams illustrating the system, apparatus, method, and different embodiments may be combined or integrated with other systems, modules, technologies or methods without departing from the scope of this application. In addition, the displayed or discussed mutual couplings or direct couplings or communication connections may be implemented through some interfaces. The indirect couplings or communication connections between the apparatuses or units may be implemented in electronic, mechanical, or other forms.

The foregoing descriptions are merely specific implementations of this application, but are not intended to limit the protection scope of this application. Any variation or replacement readily figured out by a person skilled in the art within the technical scope disclosed in the present disclosure shall fall within the protection scope of this application. Therefore, the protection scope of this application shall be subject to the protection scope of the claims.

What is claimed is:

1. A vehicle control method implemented by a first vehicle, and comprising:
obtaining first information of a moving object near the first vehicle when a vehicle speed of the first vehicle reaches an upper limit or a lower limit of a first vehicle speed range;
determining a first parameter based on the first information, wherein the first parameter comprises a safe driving speed range for the first vehicle and a time to collision, wherein the time to collision indicates an estimated time before the first vehicle collides with the moving object, and wherein the time to collision varies with respect to time;
updating the time to collision based on updated first information; comparing the time to collision to a preset threshold;
terminating, based on the first parameter and based on comparing the time to collision to the preset threshold, an active state of a first driver assistance system of the first vehicle, wherein the first driver assistance system operates at the first vehicle speed range;
controlling, based on the first parameter and based on comparing the time to collision to the preset threshold, the first vehicle to accelerate or decelerate beyond the first vehicle speed range toward a second vehicle speed range in which a second driver assistance system of the first vehicle operates, wherein the first vehicle speed range and the second vehicle speed range do not intersect, and wherein the controlling occurs while neither the first driver assistance system nor the second driver assistance system is in an active state;
determining that there is an intersection between the safe driving speed range and the second vehicle speed range;
activating the second driver assistance system in response to the safe driving speed range and the second vehicle speed range having the intersection; and setting, based on the first parameter and based on comparing the time to collision to the preset threshold, the first vehicle to run at a first vehicle speed in the second vehicle speed range.

2. The method of claim 1, further comprising:
obtaining updated first information;
updating the first parameter based on the updated first information to obtain an updated first parameter; and
setting, based on the updated first parameter, the first vehicle to run at a second vehicle speed within the second vehicle speed range.

3. The method of claim 1, wherein the moving object comprises a second vehicle, and wherein the first information comprises at least one of a location, a speed, a size, or a model of the second vehicle.

4. The method of claim 1, wherein obtaining the first information comprises receiving, using a receiving unit, the first information from the moving object.

5. The method of claim 1, wherein the safe driving speed range is based on a condition that there is no hazard of collision between the first vehicle and the moving object.

6. The method of claim 5, wherein terminating, based on the first parameter, the active state comprises:
determining that the safe driving speed range does not intersect with the first vehicle speed range; and
terminating the active state of the first driver assistance system in response to the safe driving speed range not intersecting with the first vehicle speed range.

7. The method of claim 5, wherein the first vehicle speed is within the safe driving speed range.

8. The method of claim 2, wherein the first parameter comprises a safe driving speed range for the first vehicle, wherein the safe driving speed range is based on a condition that there is no hazard of collision between the first vehicle and the moving object, and wherein the second vehicle speed is within the safe driving speed range.

9. An apparatus comprising:
at least one memory configured to store program instructions; and
at least one processor coupled to the at least one memory and configured to execute the instructions to:
obtain first information of a moving object near a first vehicle when a vehicle speed of the first vehicle reaches an upper limit or a lower limit of a first vehicle speed range;
determine a first parameter based on the first information, wherein the first parameter comprises a safe driving speed range for the first vehicle and a time to collision, wherein the time to collision indicates an estimated time before the first vehicle collides with the moving object, and wherein the time to collision varies with respect to time;
update the time to collision based on updated first information;
compare the time to collision to a preset threshold;
terminate, based on the first parameter and based on comparing the time to collision to the preset threshold, an active state of a first driver assistance system of the first vehicle, wherein the first driver assistance system operates at the first vehicle speed range;
control, based on the first parameter and based on comparing the time to collision to the preset threshold, the first vehicle to accelerate or decelerate beyond the first vehicle speed range toward a second vehicle speed range in which a second driver assistance system of the first vehicle operates, wherein the first vehicle speed range and the second vehicle speed range do not intersect, and wherein the controlling occurs while neither the first driver assistance system nor the second driver assistance system is in an active state;

determine that there is an intersection between the safe driving speed range and the second vehicle speed range;

activate the second driver assistance system in response to the safe driving speed range and the second vehicle speed range having the intersection; and set, based on the first parameter and based on comparing the time to collision to the preset threshold, the first vehicle to run at a first vehicle speed in the second vehicle speed range.

10. The apparatus of claim 9, wherein the at least one processor further executes the instructions to:

obtain updated first information;

update the first parameter based on the updated first information to obtain an updated first parameter; and set, based on the updated first parameter, the first vehicle to run at a second vehicle speed within the second vehicle speed range.

11. The apparatus of claim 9, wherein the moving object comprises a second vehicle, and wherein the first information comprises at least one of a location, a speed, a size, or a model of the second vehicle.

12. The apparatus of claim 9, wherein the at least one processor further executes the instructions to obtain through measurement, using a sensor, the first information of the moving object.

13. The apparatus of claim 9, wherein the safe driving speed range is based on a condition that there is no hazard of collision between the first vehicle and the moving object.

14. The apparatus of claim 13, wherein the at least one processor further executes the instructions to:

determine that the safe driving speed range does not intersect with the first vehicle speed range; and terminate the active state of the first driver assistance system in response to the safe driving speed range not intersecting with the first vehicle speed range.

15. The apparatus of claim 13, wherein the first vehicle speed is within the safe driving speed range.

16. The apparatus of claim 10, wherein the safe driving speed range is based on a condition that there is no hazard of collision between the first vehicle and the moving object, and wherein the second vehicle speed is within the safe driving speed range.

17. A computer program product comprising computer-executable instructions that are stored on a non-transitory computer-readable medium, the instructions when executed by at least one processor, cause a first vehicle to:

obtain first information of a moving object near the first vehicle when a vehicle speed of the first vehicle reaches an upper limit or a lower limit of a first vehicle speed range;

determine a first parameter based on the first information, wherein the first parameter comprises a safe driving speed range for the first vehicle and a time to collision, wherein the time to collision indicates an estimated time before the first vehicle collides with the moving object, and wherein the time to collision varies with respect to time;

update the time to collision based on updated first information;

compare the time to collision to a preset threshold;

terminate, based on the first parameter and based on comparing the time to collision to the preset threshold, an active state of a first driver assistance system of the first vehicle, wherein the first driver assistance system operates at the first vehicle speed range;

control, based on the first parameter and based on comparing the time to collision to the preset threshold, the first vehicle to accelerate or decelerate beyond the first vehicle speed range toward a second vehicle speed range in which a second driver assistance system of the first vehicle operates, wherein the first vehicle speed range and the second vehicle speed range do not intersect, and wherein the controlling occurs while neither the first driver assistance system nor the second driver assistance system is in an active state;

determine that there is an intersection between the safe driving speed range and the second vehicle speed range;

activate the second driver assistance system in response to the safe driving speed range and the second vehicle speed range having the intersection; and set, based on the first parameter and based on comparing the time to collision to the preset threshold, the first vehicle to run at a first vehicle speed above in the second vehicle speed range.

18. The computer program product of claim 17, wherein the computer-executable instructions when executed by the at least one processor further causes the first vehicle to:

obtain updated first information;

update the first parameter based on the updated first information; and set, based on an updated first parameter, the first vehicle to run at a second vehicle speed within the second vehicle speed range.

19. The computer program product of claim 17, wherein the safe driving speed range is based on a condition that there is no hazard of collision between the first vehicle and the moving object.

20. The computer program product of claim 19, wherein the computer-executable instructions when executed by the at least one processor further causes the first vehicle to:

determine that the safe driving speed range does not intersect with the first vehicle speed range; and terminate the active state of the first driver assistance system in response to the safe driving speed range not intersecting with the first vehicle speed range.

* * * * *